(12) United States Patent
Kim et al.

(10) Patent No.: US 9,571,281 B2
(45) Date of Patent: Feb. 14, 2017

(54) CRT-RSA ENCRYPTION METHOD AND APPARATUS

(71) Applicants: Sung-Kyoung Kim, Hwaseong-Si (KR); In-Je Yang, Seongnam-Si (KR); Hyun-Dong So, Hwaseong-Si (KR); Hyo-Sun Hwang, Bucheon-Si (KR)

(72) Inventors: Sung-Kyoung Kim, Hwaseong-Si (KR); In-Je Yang, Seongnam-Si (KR); Hyun-Dong So, Hwaseong-Si (KR); Hyo-Sun Hwang, Bucheon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 98 days.

(21) Appl. No.: 14/571,442

(22) Filed: Dec. 16, 2014

(65) Prior Publication Data

US 2015/0222434 A1 Aug. 6, 2015

(30) Foreign Application Priority Data

Feb. 3, 2014 (KR) .................. 10-2014-0012212

(51) Int. Cl.
*H04L 9/00* (2006.01)
*H04L 9/30* (2006.01)
*H04L 9/06* (2006.01)

(52) U.S. Cl.
CPC ............ *H04L 9/302* (2013.01); *H04L 9/004* (2013.01); *H04L 9/0625* (2013.01)

(58) Field of Classification Search
CPC .......................... H04L 9/302; H04L 9/0625
(Continued)

(56) References Cited

U.S. PATENT DOCUMENTS 5,991,415 A 11/1999 Shamir
6,144,740 A 11/2000 Laih et al.
(Continued)

FOREIGN PATENT DOCUMENTS

EP 1 347 596 B1 2/2007
EP 2 222 012 A1 8/2010
(Continued)

OTHER PUBLICATIONS

W. T. Penzhorn, "Fast decryption algorithms for the RSA cryptosystem," AFRICON, 2004. 7th AFRICON Conference in Africa, Gaborone, 2004, pp. 361-364 vol. 1.*
(Continued)

*Primary Examiner* — Alexander Lagor
(74) *Attorney, Agent, or Firm* — Volentine & Whitt, PLLC

(57) ABSTRACT

CRT-RSA encryption methods and apparatuses are disclosed. The CRT-RSA encryption method includes: calculating first parameter information and second parameter information used in a modular exponential calculation process based on a modular calculation result of a secret key that is obtained using Euler's phi function with respect to two different prime numbers calculated from the public key; performing a modular exponential calculation with respect to a next block based on calculation information of a previous block, in a block unit divided respectively from the first parameter information and the second parameter information; and calculating an encryption process based on a CRT calculation by using the modular exponential calculation results.

20 Claims, 10 Drawing Sheets

(58) Field of Classification Search
USPC .......................................................... 380/28
See application file for complete search history.

(56) References Cited

U.S. PATENT DOCUMENTS

| | | | |
|---|---|---|---|
| 7,496,758 B2 | 2/2009 | Fischer et al. | |
| 2006/0029224 A1 | 2/2006 | Baek et al. | |
| 2013/0208886 A1* | 8/2013 | Lee ........................... | H04L 9/28 380/28 |

FOREIGN PATENT DOCUMENTS

| | | |
|---|---|---|
| KR | 10-0431047 | 4/2004 |
| KR | 10-0431286 | 4/2004 |
| KR | 10-0953715 | 4/2010 |
| KR | 10-0953716 | 4/2010 |
| KR | 10-0954844 | 4/2010 |
| KR | 10-1112570 | 1/2012 |
| KR | 10-2013-0054591 A | 5/2013 |
| WO | 2006/103149 A1 | 10/2006 |
| WO | 2008/114310 A1 | 9/2008 |

OTHER PUBLICATIONS

"Data Encryption Standar (DES)", Federal Information Processing Standards Publication, FIPS PUB 46-3, Oct. 25, 1999, U.S. Dept. of Commerce.*
Chung-Hsien Wu, Jin-Hua Hong and Cheng-Wen Wu, "RSA cryptosystem design based on the Chinese remainder theorem," Design Automation Conference, 2001. Proceedings of the ASP-DAC 2001. Asia and South Pacific, Yokohama, 2001, pp. 391-395.*
J. Ha, C. Jun, J. Park, S. Moon and C. Kim, "A New CRT-RSA Scheme Resistant to Power Analysis and Fault Attacks," Convergence and Hybrid Information Technology, 2008. ICCIT '08. Third International Conference on, Busan, 2008, pp. 351-356.*
A. P. Fournaris and O. Koufopavlou, "Protecting CRT RSA against Fault and Power Side Channel Attacks," 2012 IEEE Computer Society Annual Symposium on VLSI, Amherst, MA, 2012, pp. 159-164.*
J. S. Coron, C. Giraud, N. Morin, G. Piret and D. Vigilant, "Fault Attacks and Countermeasures on Vigilant's RSA-CRT Algorithm," Fault Diagnosis and Tolerance in Cryptography (FDTC), 2010 Workshop on, Santa Barbara, CA, 2010, pp. 89-96.*
C. H. Kim and J. J. Quisquater, "How can we overcome both side channel analysis and fault attacks on RSA-CRT?," Fault Diagnosis and Tolerance in Cryptography, 2007. FDTC 2007. Workshop on, Vienna, 2007, pp. 21-29.*
C. Aumuller et al., "Fault Attacks on RSA with CRT : Concrete Results and Practical Countermeasures".
Johannes Blomer et al., "A New CRT-RSA Algorithm Secure Against Bellcore Attacks".
Nevine Ebeid et al., "A New CRT-RSA Algorithm Resistant to Powerful Fault Attacks".
Sung-Min Yen et al., "Cryptanalysis of Two Protocols for RSA with CRT Based on Fault Infection," pp. 53-61.
Chong Hee Kim et al., "How can we overcome both side channel analysis and fault attacks on RSA-CRT?" 2007 Workshop on Fault Diagnosis and Tolerance in Cryptography, pp. 21-29.
Mathieu Ciet et al., "Practical Fault Countermeasures for Chinese Remaindering Based RSA".
Christophe Giraud, "An RSA Implementation Resistant to Fault Attacks and to Simple Power Analysis," IEEE Transactions on Computers, vol. 55, No. 9, Sep. 2005, pp. 1116-1120.
Jae Cheoul Ha et al., "A New CRT-RSA Scheme Resistant to Power Analysis and Fault Attacks," Third 2008 International Conference on Convergence and Hybrid Information Technology, pp. 351-356.
Jean-Sebastien Coron et al., "Fault Attacks and Countermeasures on Vigilant's RSA-CRT Algorithm," 2010 Workshop on Fault Diagnosis and Tolerance in Cryptography, pp. 89-96.
Arnaud Boscher et al., "CRT RSA Algorithm Protected Against Fault Attacks," pp. 229-243.
Bellcre: New Threat Model Breaks Crypto Codes. Press Release (1996).
Bao, F. et al., "Breaking Public Key Cryptosystems on Tamper Resistant Devices in the Presence of Transient Faults," Security Protocols, Lecture Notes in Computer Science, vol. 1361.

* cited by examiner

FIG. 8

Proposed CRT RSA algorithm against Power attacks and Fault attacks

Input: $p, q, d_p, d_q, I_p (= p^{-1} \bmod q)$, message $m, \Psi_d (= d_p \oplus d_q)$, and $\Psi_{pq} (= p \oplus q)$ Output: $S (= m^d \bmod N)$ 1. Generate a 32 bits random odd number $s$, $r$
2. $p' \leftarrow (\Psi_{pq} \oplus q) + p(s-1)$, $q' \leftarrow (\Psi_{pq} \oplus p) + q(s-1)$, $T_{pq} \leftarrow s(p+q)$
3. $d'_p \leftarrow (\Psi_d \oplus d_q) \& d_p$, $d'_q \leftarrow (\Psi_d \oplus d_p) \& d_q$
4. $L'_{d_p} \leftarrow LeftB(d'_p)$, $L'_{d_q} \leftarrow LeftB(d'_q)$
5. $(L_{S_p}, L'_{S_p}, CK_{L_p}) \leftarrow PMExp(m, 1, p', L'_{d_p}, 1)$
6. $t'_{d_p} \leftarrow L'_{d_p} \& (CK_{L_p} \oplus p')$
7. $(L_{S_q}, L'_{S_q}, CK_{L_q}) \leftarrow PMExp(m, 1, q', L'_{d_q}, 1)$
8. $t'_{d_q} \leftarrow L'_{d_q} \& (CK_{L_q} \oplus q')$
9. $R'_{d_p} \leftarrow (\Psi_d \oplus d'_q) - t'_{d_p} \cdot 2^{\frac{n}{2}}$, $R'_{d_q} \leftarrow (\Psi_d \oplus d'_p) - t'_{d_q} \cdot 2^{\frac{n}{2}}$
10. $(R_{S_p}, R'_{S_p}, CK_{R_p}) \leftarrow PMExp(L_{S_p}, L'_{S_p}, p', R'_{d_p}, 0)$
11. $(R_{S_q}, R'_{S_q}, CK_{R_q}) \leftarrow PMExp(L_{S_q}, L'_{S_q}, q', R'_{d_q}, 0)$
12. $t_p \leftarrow (T_{pq} + p) - p' - q'$, $t_q \leftarrow (T_{pq} + q) - p' - q'$
13. $S \leftarrow CRT_{FA}(R_{S_p}, R_{S_q})$, $S' \leftarrow CRT_{FA}(R'_{S_p}, R'_{S_q})$
14. $S_{d_{pq}} \leftarrow (t'_{d_{p_1}} \| (CK_{R_p} \oplus p')) + (t'_{d_{q_1}} \| (CK_{R_q} \oplus q'))$
15. If $((S + T_d) \neq m \cdot (S' + S_{d_{pq}}))$ then Return $(error)$
16. $S \leftarrow (S + T_d) \& m \cdot (S' + S_{d_{pq}}) \bmod t_p t_q$
17. Return $(S = m^d \bmod N)$

FIG. 9

Proposed Modular exponentiation against Power attacks and Fault attacks (PMExp)
Input: $P_s, P_s'$, modulus $Z$, exponent $X(-x_{n-1}, \ldots, X_1, X_0)$, $CBit$
Output: $S, S', CK_{xz}(= X \oplus Z)$ 1. $a[0] \leftarrow P_s'$, $a[1] \leftarrow P_s$, $CK_{xz} \leftarrow 0$
2. for $(i = n - 1)$ to 1 do
   2.1 Generate that random bit $r$
   2.2 $CK_{xz} \leftarrow (CK_{xz} \ll MSB(a[0])) + x_i$
   2.3 $a[2] \leftarrow a[x_i]a[r] \bmod Z$
   2.4 $a[\bar{r}] \leftarrow a[\bar{r}]a[x_i] \bmod Z$
   2.5 $a[r] \leftarrow a[2] \bmod Z$
3. Generate that random bit $r$
4. $a[2] \leftarrow a[cBit \,\&\, x_0]a[r] \bmod Z$
5. $a[\bar{r}] \leftarrow a[\bar{r}]a[CBit \,\&\, x_0] \bmod Z$
6. $a[r] \leftarrow a[2]$
7. $CK_{xz} \leftarrow \left(\left(CK_{xz} \ll (MSB(a[0]) \,\&\, MSB(a[1]))\right) + x_0\right) \oplus Z$
8. Return $(a[1], a[0], CK_{xz})$

FIG. 10

Proposed CRT RSA algorithm against Power attacks and Fault attacks

Input: $p, q, d_p, d_q, I_q(= q^{-1} \bmod p)$, message $m$, $\Psi_d(= d_p \oplus d_q)$, and $\Psi_{pq}(= p \oplus q)$ Output: $S(= m^d \bmod N)$ 1. Generate a 32 bits random odd number $s$
2. $p' \leftarrow (\Psi_{pq} \oplus q) \& p$, $q' \leftarrow (\Psi_{pq} \oplus p) \& q$, $T_d \leftarrow (d_p + d_q) + s(p + q - 2)$
3. $d'_p \leftarrow ((\Psi_d \oplus d_q) \& d_p) + s(p-1)$, $d'_q \leftarrow ((\Psi_d \oplus d_p) \& d_q) + s(q-1)$
4. $L'_{d_p} \leftarrow \mathbf{LeftB}(d'_p)$, $L'_{d_q} \leftarrow \mathbf{LeftB}(d'_q)$
5. $\left(L_{S_p}, L'_{S_p}, CK_{L_p}\right) \leftarrow \mathbf{PMExp}\left(m, 1, p', L'_{d_p}, 1\right)$
6. $t_{d_p} \leftarrow CK_{L_p} \oplus p$
7. $\left(L_{S_q}, L'_{S_q}, CK_{L_q}\right) \leftarrow \mathbf{PMExp}\left(m, 1, q', L'_{d_q}, 1\right)$
8. $t_{d_q} \leftarrow CK_{L_q} \oplus q$
9. $R'_{d_p} \leftarrow (T_d - d'_q) - t_{d_p} \cdot 2^{\frac{n}{2}}$, $R'_{d_q} \leftarrow (T_d - d'_p) - t_{d_q} \cdot 2^{\frac{n}{2}}$
10. $\left(R_{S_p}, R'_{S_p}, CK_{R_p}\right) \leftarrow \mathbf{PMExp}\left(L_{S_p}, L'_{S_p}, p', R'_{d_p}, 0\right)$
11. $\left(R_{S_q}, R'_{S_q}, CK_{R_q}\right) \leftarrow \mathbf{PMExp}\left(L_{S_q}, L'_{S_q}, q', R'_{d_q}, 0\right)$
12. $t_p \leftarrow \Psi_{pq} \oplus q'$, $t_q \leftarrow \Psi_{pq} \oplus p'$
13. $S \leftarrow CRT_{FA}\left(R_{S_p}, R_{S_q}\right)$, $S' \leftarrow CRT_{FA}\left(R'_{S_p}, R'_{S_q}\right)$
14. $S_{d_{pq}} \leftarrow \left(t_{d_p} \parallel (CK_{R_p} \oplus p)\right) + \left(t_{d_q} \parallel (CK_{R_q} \oplus q)\right)$
15. If $\left((S + T_d) \bmod t_p t_q \neq m \cdot (S' + S_{d_{pq}}) \bmod t_p t_q\right)$ then Return ($error$)
16. $S \leftarrow (S + T_d) \& m \cdot (S' + S_{d_{pq}}) \bmod t_p t_q$
17. Return ($S = m^d \bmod N$)

CRT-RSA ENCRYPTION METHOD AND APPARATUS

CROSS-REFERENCE TO RELATED APPLICATIONS

This application claims the benefit of Korean Patent Application No. 10-2014-0012212 filed on Feb. 3, 2014, the subject matter of which is hereby incorporated by reference.

BACKGROUND

The inventive concept relates to encryption methods and related apparatuses. More particularly, the inventive concept relates to encryption methods and related apparatuses that make use of the Chinese Remainder Theorem (CRT) as applied to Rivest Shamir Adleman (RSA) encryption methods and apparatuses.

Representative calculations involved in the use of the certain RSA encryption methods include exponentiation operation(s) using a given "secret key". Various adaptations to RSA encryption methods have been suggested to improve the efficiency of the exponentiation operations in environments where system resources (e.g., available memory space) used to perform certain calculations are limited. Among the these adaptations, the so-called Chinese Remainder Theorem (CRT) may be used to generate digital signature(s) at speeds approximately four times faster than previously used, unmodified RSA encryption methods and systems. This class of CRT modified RSA encryption methods and systems may be termed the "CRT-RSA approach" inclusive of CRT-RSA method(s) and/or CRT-RSA system(s).

Despite notable performance advantages, the CRT-RSA approach creates exploitable weaknesses in associated data processing operations. That is, CRT-RSA systems and computational methods are fairly weak against so-called "fault attacks".

SUMMARY

Embodiments of the inventive concept provide a Chinese Remainder Theorem modified, Rivest Shamir Adleman (CRT-RSA) encryption approach that provides improved resistant to fault injection attacks using a Feistel structure.

According to an aspect of the inventive concept, there is provided a CRT-RSA encryption method including: calculating first parameter information and second parameter information that are to be used in a modular exponential calculation process based on a modular calculation result of a secret key that is obtained by using Euler's phi function with respect to two different prime numbers calculated from the public key; performing a modular exponential calculation with respect to a next block based on calculation information of a previous block, in a block unit divided respectively from the first parameter information and the second parameter information; and calculating an encryption process result based on a CRT calculation by using results of the modular exponential calculation.

The calculating of the first parameter information and the second parameter information may include determining intermediate calculation information $d_p$ and $d_q$ generated based on equations $d_p = d \mod(p-1)$ and $d_q = d \mod(q-1)$ as the first parameter information and the second parameter information or determining intermediate calculation information respectively derived from $d_p$ and $d_q$ as the first parameter information and the second parameter information, wherein d denotes a secret key, p and q denote prime numbers, and a public key N satisfies a condition $N = p \cdot q$.

The calculating of the first parameter information and the second parameter information may include: calculating intermediate calculation information $d_p$ and $d_q$ based on equations $d_p = d \mod(p-1)$ and $d_q = d \mod(q-1)$; and calculating the first parameter information $d'_p$ and the second parameter information $d'_q$ respective derived from the intermediate calculation information $d_p$ and $d_q$ by using the intermediate calculation information $d_p$ and $d_q$ together, wherein d denotes a secret key, p and q denote prime numbers, and a public key N satisfies a condition $N = p \cdot q$.

The performing of the modular exponential calculation may include dividing the first parameter information and the second parameter information respectively into two blocks, and performing the modular exponential calculation with respect to the next block by using at least one of the intermediate calculation information and the calculation information in the previous block by the divided block unit.

The first parameter information and the second parameter information may be respectively divided into two blocks having equal sizes.

The performing of the modular exponential calculation may include: extracting 1A block information that is a part of the first parameter information; extracting 2A block information that is a part of the second parameter information; performing a first modular exponential calculation based on the 1A block information; performing a second modular exponential calculation based on the 2A block information; extracting 1B block information that is remaining except for the 1A block information from the first parameter information; extracting 2B block information that is remaining except for the 2A block information from the second parameter information; performing a third modular exponential calculation based on the 1B block information by using a result of the modular exponential calculation of the 1A block information; and performing a fourth modular exponential calculation based on the 2B block information by using a result of the modular exponential calculation of the 2A block information.

The extracting of the 1A block information may include calculating the 1A block information $L'_{d_p}$ based on an equation $$L'_{d_p} = LeftB(d'_p) = \sum_{i=\frac{n}{2}}^{n-1} d'_{p_i} 2^{i-\frac{n}{2}} = \left(d'_{p_{n-1}}, d'_{p_{n-2}}, \ldots, d'_{p_{\frac{n}{2}}}\right)_2$$

from the first parameter information $d'_p$ having an n-bit length.

The extracting of the 2A block information may include calculating the 2A block information $L'_{d_q}$ based on an equation $$L'_{d_q} = LeftB(d'_q) = \sum_{i=\frac{n}{2}}^{n-1} d'_{q_i} 2^{i-\frac{n}{2}} = \left(d'_{q_{n-1}}, d'_{q_{n-2}}, \ldots, d'_{q_{\frac{n}{2}}}\right)_2$$

from the second parameter information $d'_q$ having an n-bit length.

The performing of the first modular exponential calculation may include calculating a first calculation value $L_{s_p}$ and a second calculation value $L'_{s_p}$ that are modular exponential calculation results with respect to the 1A block information $L'_{d_p}$ divided from the first parameter information $d'_p$ based on equations $L_{s_p}=m^{LeftB(d'_p)+1}$ mod sp and $L'_{s_p}=m^{LeftB(d'_p)}$ mod sp, wherein m denotes a message to be encrypted, s denotes a random number, and p denotes a prime number.

The performing of the first modular exponential calculation may include further calculating a third calculation value $CK_{L_p}$ based on an equation $CK_{L_p}=\text{LeftB}(d'_p) \oplus p'$, and p' denotes intermediate calculation information derived from p by the calculation using s, p, and q, s is a random number, p and q are prime numbers, and the public key N satisfies a condition $N=p \cdot q$.

The performing of the second modular exponential calculation may include calculating a fourth calculation value $L_{s_q}$ and a fifth calculation value $L'_{s_q}$ that are modular exponential calculation results with respect to the 2A block information $L'_{d_q}$ divided from the second parameter information $d'_q$ based on the equations $L_{s_q}=m^{LeftB(d'_q)+1}$ mod sq and $L'_{s_q}=m^{LeftB(d'_q)}$ mod sq, wherein m is a message to be encrypted, s denotes a random number, and q is a prime number.

The performing of the second modular exponential calculation may further include a sixth calculation value $CK_{L_q}$ based on an equation $CK_{L_q}=\text{LeftB}(d'_q) \oplus q'$, wherein q' denotes intermediate calculation information derived from q by the calculation using s, p, and q, s is a random number, p and q are prime numbers, and the public key N satisfies a condition $N=p \cdot q$.

The extracting of the 1B block information may include calculating the 1B block information $R'_{d_p}$ from the first parameter information $d'_p$ having an n-bit length based on an equation $$R'_{d_p} = (\Psi_d \oplus d'_q) - t'_{d_p} \cdot 2^{\frac{n}{2}},$$

wherein $\Psi_d$ is determined based on $d_p$ and $d_q$, $d_p$ and $d_q$ are determined respectively based on equations $d_p=d \bmod(p-1)$ and $d_q=d \bmod(q-1)$, $t'_{d_p}$ is determined based on the 1A block information and the intermediate calculation information, denotes the second parameter information, d denotes a secret key, p and q are prime numbers, and the public key N satisfies a condition $N=p \cdot q$.

The extracting of the 2B block information may include calculating the 2B block information $R'_{d_q}$ from the second parameter information $d'_q$ of an n-bit length based on an equation $$R'_{d_q} = (\Psi_d \oplus d'_q) - t'_{d_q} \cdot 2^{\frac{n}{2}},$$

wherein $\Psi_d$ is determined based on $d_p$ and $d_q$, $d_p$ and $d_q$ are determined respectively based on equations $d_p=d \bmod(p-1)$, and $d_q=d \bmod(q-1)$, $t'_{d_q}$ is determined based on the 1A block information and the intermediate calculation information, denotes the first parameter information, d denotes a secret key, p and q are prime numbers, and the public key N satisfies a condition $N=p \cdot q$.

The performing of the third modular exponential calculation may include calculating a seventh calculation value $R_{s_p}$ and an eighth calculation value $R'_{s_p}$ based on equations $R_{s_p}=m^{d'_p}$ mod sp and $R'_{s_p}=m^{d'_p-1}$ mod sp by performing a modular exponential calculation with respect to the 1B block information $R'_{d_p}$ using the modular exponential calculation result with respect to the 1A block information $L'_{d_p}$, wherein $d'_p$ denotes the first parameter information, m denotes a message to be encrypted, s denotes a random number, and p denotes a prime number.

The performing of the third modular exponential calculation may further include calculating a ninth calculation value $CK_{R_p}$ based on an equation $$CK_{R_p} = \left(\sum_{i=0}^{\frac{n}{2}-1} d'_{p_i} \cdot 2^i\right) \oplus p',$$

wherein p' denotes intermediate calculation information derived from p by the calculation using s, p, and q, s is a random number, p and q are prime numbers, and the public key N satisfies a condition $N=p \cdot q$.

The performing of the fourth modular exponential calculation may include calculating a tenth calculation value $R_{s_q}$ and an eleventh calculation value $R'_{s_q}$ based on equations $R_{s_q}=m^{d'_q}$ mod sq and $R'_{s_q}=m^{d'_q-1}$ mod sq by performing a modular exponential calculation with respect to the 2B block information $R'_{d_q}$ using the modular exponential calculation information with respect to the 2A block information $L'_{d_q}$, wherein $d'_q$ denotes the second parameter information, m denotes a message to be encrypted, s denotes a random number, and q denotes a prime number.

The performing of the fourth modular exponential calculation may further include calculating a twelfth calculation value $CK_{R_q}$ based on an equation $$CK_{R_q} = \left(\sum_{i=0}^{\frac{n}{2}-1} d'_{q_i} 2^i\right) \oplus q',$$

wherein q' denotes intermediate calculation information derived from q by the calculation using s, p, and q, s is a random number, p and q are prime numbers, and the public key N satisfies a condition $N=p \cdot q$.

The calculating of the encryption process result may include: calculating a thirteenth calculation value S and a fourteenth calculation value S' based on equations $S=CRT_{FA}(R_{s_p},R_{s_q})=m^d-(d'_p \oplus d'_q) \bmod N$ and $S'=CRT_{FA}(R'_{s_p},R'_{s_q})=m^{d-1}-(d'_p \oplus d'_q) \bmod N$ by using the modular exponential calculation results; and outputting an encrypted result based on a comparison result of the thirteenth calculation value S and the fourteenth calculation value S', wherein $R_{s_p}$ and $R'_{s_p}$ are values calculated during the modular exponential calculations based on the first parameter $d'_p$, $R_{s_q}$ and $R'_{s_q}$ are values calculated during the modular exponential calculations based on the second parameter $d'_q$, m is a message, d denotes a secret key, and N denotes a public key.

According to another aspect of the inventive concept, there is provided a Chinese remainder theorem (CRT)-Rivest Shamir Adleman (RSA) encryption apparatus including: a register block for storing input information necessary for encryption processes and intermediate calculation information generated during encryption calculation processes; an intermediate value calculator for calculating intermediate calculation information including first parameter information and second parameter information for determining an exponentiation operation value about a message in a modular exponential calculation process by applying input information read from the register block; an information partition processing unit for dividing the first parameter information and the second parameter information respectively into a plurality of blocks; a modular multiplier performing modular exponentiation calculation processes by applying the intermediate calculation information to each of the blocks divided from the first parameter information and the second parameter information through a plurality of calculating iterations; a CRT calculator for performing a CRT calculation by using results of the modular exponential calculation; and an encryption result calculator for calculating an encryption processing result based on a result of the CRT calculation.

The modular multiplier may sequentially perform a first modular exponential calculation based on 1A block information divided from the first parameter information, a second modular exponential calculation based on 2A block information divided from the second parameter information, a third modular exponential calculation based on 1B block information that is a remaining except for the 1A block information in the first parameter information, and a fourth modular exponential calculation based on 2B block information that is a remaining except for the 2A block information in the second parameter information, and the third modular exponential calculation is performed by using a result of the first modular exponential calculation and the fourth modular exponential calculation is performed by using a result of the second modular exponential calculation.

The intermediate value calculator may calculate at least one of the intermediate calculation information applied to divide the first and second parameter information respectively into the plurality of blocks and the intermediate calculation information applied to the modular exponential calculation of the block unit.

According to another aspect of the inventive concept, there is provided a computer-readable storage medium having embodied thereon a program code for implementing a Chinese remainder theorem (CRT)-Rivest Shamir Adleman (RSA) encryption method in a computer, wherein the CRT-RSA encryption method may include: calculating first parameter information and second parameter information that are to be used in a modular exponential calculation process based on a modular calculation result of a secret key that is obtained by using Euler's phi function with respect to two different prime numbers calculated from the public key; performing a modular exponential calculation with respect to a next block based on calculation information of a previous block, in a block unit divided respectively from the first parameter information and the second parameter information; and calculating an encryption process based on a CRT calculation by using results of the modular exponential calculation.

BRIEF DESCRIPTION OF THE DRAWINGS

Certain embodiments of the inventive concept will be more clearly understood from the following written description taken in conjunction with the accompanying drawings in which:

FIG. 8 is a list of processing conditions and steps that may be used in one example to implement a CRT-RSA encryption method according to an embodiment of the inventive concept;

FIG. 9 is a list of processing conditions and steps that may be used to implement a modular exponential operation applied to the CRT-RSA encryption method of FIG. 8;

FIG. 10 is a list of processing conditions and steps that may be used in another example to implement a CRT-RSA encryption method according to an embodiment of the inventive concept;

DETAILED DESCRIPTION OF EMBODIMENTS

Figure 1:
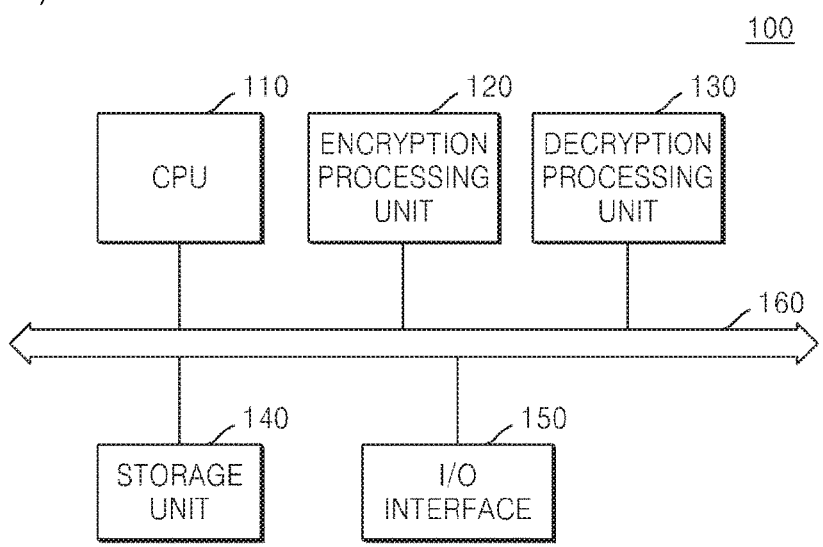
FIG. 1 is a block diagram of an electronic device capable of using a Chinese Remainder Theorem (CRT)-Rivest Shamir Adleman (RSA) approach according to an embodiment of the inventive concept.

Hereinafter, certain embodiments of the inventive concept will be described in some additional detail with reference to the accompanying drawings. Embodiments of the inventive concept are provided so that this disclosure will be thorough and complete, and will fully convey the concept of the inventive concept to one of ordinary skill in the art. Since the inventive concept may have diverse modified embodiments, preferred embodiments are illustrated in the drawings and are described in the detailed description of the inventive concept. However, this does not limit the inventive concept within specific embodiments and it should be understood that the inventive concept covers all the modifications, equivalents, and replacements within the idea and technical scope of the inventive concept. Throughout the written description and drawings, like reference numerals and labels are used to denote like or similar elements.

The terms used in this application are used to describe only certain embodiments, and are not intended to limit the present invention. In the following description, the technical terms are used only for explaining a specific exemplary embodiment while not limiting the present embodiments. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

Particular forms of the Rivest Shamir Adleman (RSA) algorithm as well as exemplary faults attacks thereon will be described below. Attacks on the RSA algorithm include both passive and active attacks. Passive attacks or so-called "side channel attacks" include attacks characterized by analyzing the RSA algorithm execution time, analyzing electric power consumption during execution of the RSA algorithm, as well as corresponding signal waveforms. Active attacks include attacks injecting deformed external clock signals, changing temperature, or subjecting a device executing the RSA algorithm to a laser, such as an X-ray laser. Any one or more of these attack approaches may be referred to as "fault attack". A fault attack is characterized by an attacker injecting one or more faults into a computational environment (e.g., a smart card or smart card reader) running the RSA encryption algorithm. The object of many fault attacks is the location and identification of a prime number that is used as a secret value.

A representative calculation of the RSA algorithm is an exponentiation operation that uses a secret key. As noted above, certain performance aspects associated with execution of the RSA algorithm may be improved by modifying the RSA algorithm using the Chinese Remainder Theorem (CRT). This class of algorithms, related encryption methods, and systems will be referred to the "CRT-RSA approach" denoting related algorithm(s), methods of data encryption using the same, and/or system(s) encrypting data using such encryption methods.

According to certain embodiments of the inventive concept, a CRT-RSA approach is provided that is made notably more resistant to fault attacks by use a Feistel structure. FIG. 1 is a block diagram illustrating an electronic device 100 that is capable of implementing the CRT-RSA approach according to an embodiment of the inventive concept.

Referring to FIG. 1, the electronic device 100 comprises; a central processing unit (CPU) 110, an encryption processing unit 120, a decryption processing unit 130, a storage unit 140, an input/output (I/O) interface 150, and a bus 160. The electronic device 100 may variously configured to be (e.g.,) a mobile phone, smart card, personal computer (PC), laptop computer, personal digital assistant (PDA), etc.

The CPU 110 is electrically connected to the encryption processing unit 120, the decryption processing unit 130, the storage unit 140, and the I/O interface 150 via the bus 160, where the bus 160 is a transmission path used to communicate information (e.g., data, control signals, address signals, and/or commands) between the CPU 110, encryption processing unit 120, decryption processing unit 130, storage unit 140, and I/O interface 150 of the electronic device 100.

The CPU 110 controls the overall operation of the electronic device 110. That is, the CPU 110 controls the electronic device 100 to interpret a command received via the I/O interface 150 and to perform corresponding operation(s). For example, the CPU 110 may control the electronic device 100 to perform an encryption process using the encryption processing unit 120 that operates according to a defined CRT-RSA approach consistent with one or more embodiments of the inventive concept.

The storage unit 140 may be used to store data (e.g., command data, programming data, payload data, etc.) received via the I/O interface 150, as well as data and "control information" related to an CRT-RSA approach. For example, control information that may be used during a CRT-RSA approach includes; a public key, a secret key, a message, etc.

The I/O interface 150 will be configured to implement at least one data communication protocol capable of exchanging data between a host (not shown) and the electronic device 100. For example, the I/O interface 150 may be realized as an advanced technology attachment (ATA) interface, a serial ATA (SATA) interface, a parallel ATA (PATA) interface, a universal serial bus (USB) or a serial attached small computer system (SAS) interface, a small computer system interface (SCSI), an embedded multi-media card (eMMC) interface, or a UNIX file system (UFS) interface. However, embodiments of the present inventive concept are not limited to only these listed examples.

The encryption processing unit 120 may include hardware components and/or software components configured to perform an encryption process using a CRT-RSA algorithm based on a public key, secret key, and message read from the storage unit 140.

According to certain CRT-RSA approaches contemplated by the embodiments of the inventive concept, a Feistel structure is constructed and applied during execution of the CRT-RSA algorithm in order to widen a potential fault dispersion. In one such approach, secret values 'p' and 'q' (or $d_p$ and $d_q$, respectively derived from p and q) are divided and encrypted. For example, if the bit length of defined secret values p and q is assumed to be 'n; ten relevant exponential calculation(s) may be performed with respect to (n/2 of p and q) like in the Feistel structure. Each corresponding exponential calculation result may be used in a next exponential calculation to thereby induce greater fault dispersion.

One CRT-RSA algorithm contemplated by certain embodiments of the inventive concept includes a threshold operation of calculating "first parameter information" and "second parameter information" to be used in a modular exponential calculation process based on a modular calculation result of a secret key which is obtained by using Euler's phi function with respect to two different prime numbers calculated from the public key. This threshold operation may be followed by an operation performing a modular exponential calculation with respect to a next block based on calculation information from a previous block, assuming a block unit basis for the data being processed, wherein the blocks are divided using the first parameter information and second parameter information. Then, an operation of calculating an encryption processing result based on a CRT calculation using the modular exponential calculation result may be performed.

The decryption processing unit 130 includes hardware components and/or software components configured to perform a decryption process on encrypted text communicated via the I/O interface 150 by using the public key and the secret key read from the storage unit 140. In this context when a computational block, method, and/or system is said to be related to "encryption" it presupposes that an analogous block, method and/or system is related to corresponding "decryption". Here, the execution of certain CRT-RSA encryption and/or decryption algorithms may be implicated in various methods and systems according to the inventive concept.

Figure 2:
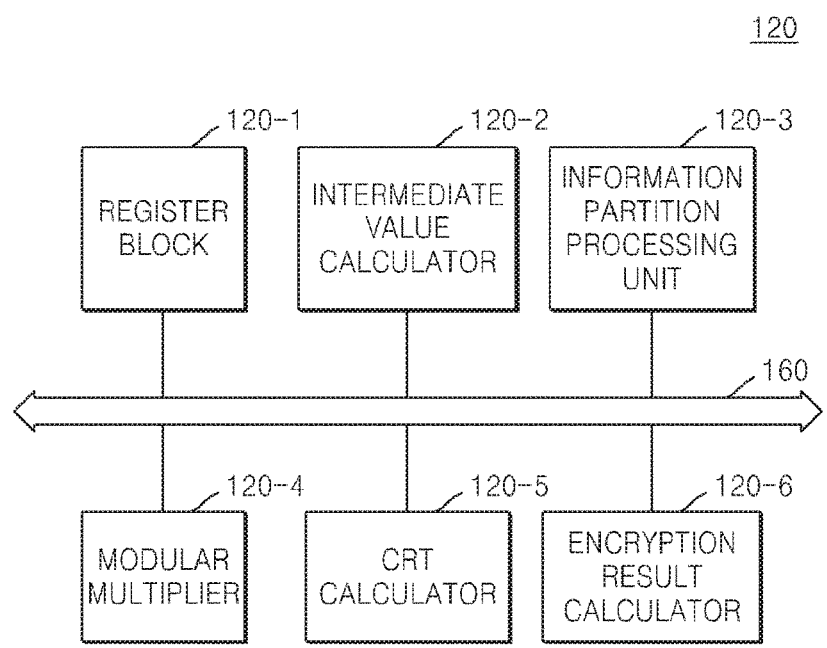
FIG. 2 is a block diagram further illustrating the encryption processing unit 120 of FIG. 1.

FIG. 2 is a block diagram further illustrating in one example the encryption processing unit 120 of FIG. 1.

As shown in FIG. 2, the encryption processing unit 120 comprises; a register block 120-1, an intermediate value calculator 120-2, an information partition processing unit 120-3, a modular multiplier 120-4, a CRT calculator 120-5, an encryption result calculator 120-6, and the bus 160.

The register block 120-1 consists of a plurality of registers, and input information necessary to the encryption process, as well as intermediate calculation information generated during encryption calculation process(es) may be stored in designated registers of the register block 120-1.

For example, the register block 120-1 may store input information to a CRT-RSA algorithm such as that listed, for example, in FIG. 8. That is, inputs such as p, q, $d_p$, $d_q$, $I_p$ (where $I_p = p^{-1}$ mod q), a message 'm', $\Psi_d$, where $\Psi_d$ is equal to a direct sum of $d_p$ and $d_q$ and $\Psi_{pd}$, where $\Psi_{pd}$ is equal to a direct sum of p and q as well as intermediate calculation information generated by illustrated exemplary steps 1 through 17. Here, 'p' and 'q' are prime numbers, and a public key N satisfies the condition (N=p times q). In addition, $d_p$ and $d_q$ are information values respectively generated by the expressions ($d_p$=d mod (p−1)) and ($d_q$=d mod (q−1)), where 'd' is a secret key.

Alternately, the register block 120-1 may store similar input information to a CRT-RSA algorithm such as that listed, for example, in FIG. 10.

The intermediate value calculator 120-2 may be used to calculate intermediate calculation information including the first parameter information and second parameter information for determining an exponentiation operation value about a message in the modular exponential calculation process by applying input information read from the register block 120-1.

For example, the intermediate value calculator 120-2 may be used to perform calculations such as the processes numbered 2, 3, 6, 8, 12, and 14 in the listings of FIGS. 8 and 10, and to generate calculation results as the intermediate calculation information. The intermediate value calculator 120-2 may also be used to calculate certain intermediate calculation information like $CK_{Lp}$, $CK_{Lq}$, $CK_{Rp}$ and $CK_{Rq}$ in the processes numbered 4, 5, 10, and 11 in the listings of FIGS. 8 and 10.

The information partition processing unit 120-3 divides the first parameter information and the second parameter information that determine exponentiation values of the message in the modular exponential calculation process respectively into a plurality of blocks. For example, in the CRT-RSA algorithm shown in FIG. 8 and FIG. 10, the first parameter information is $d'_p$, and the second parameter information is $d'_q$. For example, the first parameter information $d'_p$ and the second parameter information $d'_q$ may be respectively divided into two blocks. That is, the first parameter information $d'_p$ and the second parameter information $d'_q$ may be respectively divided into two blocks having equal sizes.

For example, the information partition processing unit 120-3 may divide the first parameter information $d'_p$ and the second parameter information $d'_q$ respectively into a plurality of blocks as shown in processes numbered 4 and 9 in the CRT-RSA algorithm shown in FIG. 9.

The information partition processing unit 120-3 may be used to calculate 1A block information $L'_{d_p}$ from the first parameter information $d'_p$ of an n-bit length based on calculation of $$L'_{d_p} = LeftB(d'_p) = \sum_{i=\frac{n}{2}}^{n-1} d'_{p_i} 2^{i-\frac{n}{2}} = \left(d'_{p_{n-1}}, d'_{p_{n-2}}, \ldots, d'_{p_{\frac{n}{2}}}\right)_2$$

as shown in process 4 of the CRT-RSA algorithm shown in FIG. 8.

The information partition processing unit 120-3 may also be used to calculate 2A block information from the second parameter information $d'_q$ of an n-bit length based on calculation of $$L'_{d_p} = LeftB(d'_q) = \sum_{i=\frac{n}{2}}^{n-1} d'_{q_i} 2^{i-\frac{n}{2}} = \left(d'_{q_{n-1}}, d'_{q_{n-2}}, \ldots, d'_{q_{\frac{n}{2}}}\right)_2,$$

as shown in process 4 of the CRT-RSA algorithm shown in FIG. 8.

The information partition processing unit 120-3 may also be used to calculate 1B block information from the first parameter information $d'_p$ of an n-bit length based on calculation of $$R'_{d_p} = (\Psi_d \oplus d'_q) - t'_{d_p} \cdot 2^{\frac{n}{2}}$$

using the input information and the intermediate calculation information stored in the register block 120-1, as shown in process 9 of the CRT-RSA algorithm shown in FIG. 8.

The information partition processing unit 120-3 may also be used to calculate 2B block information $R'_{d_q}$ from the second parameter information $d'_q$ of the n-bit length based on calculation of $$R'_{d_q} = (\Psi_d \oplus d'_p) - t'_{d_q} \cdot 2^{\frac{n}{2}}$$

using the input information and the intermediate calculation information stored in the register block 120-1, as shown in the process 9 of the CRT-RSA algorithm shown in FIG. 10.

In the above manner, the information partition processing unit 120-3 may respectively divide the first parameter information and second parameter information into a corresponding plurality of blocks like the processes 4 and 9 of the CRT-RSA algorithm shown in FIG. 10.

The modular multiplier 120-4 may be used to perform modular exponentiation calculation processes by applying the intermediate calculation information to each of the blocks divided from the first parameter information $d'_p$ and second parameter information $d'_q$ through a plurality of calculating iterations. For example, the modular exponentiation calculation process may be performed using the modular exponentiation calculation algorithm shown in FIG. 9.

That is, the modular multiplier 120-4 may perform the modular exponentiation calculation according to a block unit such as the processes numbered 5, 7, 10, and 11 in the CRT-RSA algorithm shown in FIG. 8 or the CRT-RSA algorithm shown in FIG. 10.

In this regard, the modular multiplier 120-4 may calculate a first calculation value $L_{s_p}$ and a second calculation value $L'_{s_p}$ as modular exponentiation calculation results related to the 1A block information $L'_{d_p}$ that has been divided from the first parameter information $d'_p$ using the calculation: $L_{s_p} = m^{LeftB(d'_p)+1}$ mod sp and the calculation: $L'_{s_p} = m^{LeftB(d'_p)}$ mod sp by using the input information and the intermediate calculation information stored in the register block 120-1. This approach is shown, for example, by process 5 in the CRT-RSA algorithm of FIG. 8.

The modular multiplier 120-4 may also be used to calculate a fourth calculation value $L_{s_q}$ and a fifth calculation value $L'_{s_q}$ as modular exponentiation calculation results related to the 2A block information $L'_{d_q}$ that has been divided from the second parameter information $d'_q$ using the calculation: $L_{s_q} = m^{LeftB(d'_q)+1}$ mod$_{sq}$ and the calculation: $L'_{s_q} = m^{LeftB(d'_q)}$ mod$_{sq}$ using the input information and the intermediate calculation information stored in the register block 120-1. This approach is shown, for example, by process 7 in the CRT-RSA algorithm of FIG. 8.

The modular multiplier 120-4 may also be used to calculate a seventh calculation value $R_{s_p}$ and an eighth calculation value $R'_{s_p}$ as modular exponentiation calculation results related to the 1B block information $R'_{d_p}$ based on a calculation: $R_{s_p} = m^{d'_p}$ mod sp and a calculation: $R'_{s_p} = m^{d'_p-1}$ mod sp using the input information and the intermediate calculation information stored in the register block 120-1. This approach is shown, for example, by process 10 in the CRT-RSA algorithm of FIG. 8. Here, the modular exponentiation calculation information related to the 1A block information $L'_{d_p}$ may be used.

The modular multiplier 120-4 may also be used to calculate a tenth calculation value $R_{s_q}$ and an eleventh calculation value $R'_{s_q}$ as modular exponentiation calculation results related to the 2B block information $R'_{d_q}$ based on a calculation: $R_{s_q} = m^{d'_q}$ mod sq and a calculation: $R'_{s_q} = m^{d'_q-1}$ mod sq using the input information and the intermediate calculation information stored in the register block 120-1. This approach is shown, for example, by the process 11 in the CRT-RSA algorithm of FIG. 8. Here, the modular exponentiation calculation information related to the 2A block information $L'_{d_q}$ may be used.

In the above manner, the modular multiplier 120-4 may be used to perform the modular exponentiation calculation for each of a number of blocks, like in the exemplary processes 5, 7, 10, and 11 of the CRT-RSA algorithm listed in FIG. 10.

The CRT calculator 120-5 may be used to perform a CRT calculation using the results of the modular exponentiation calculations. For example, the CRT calculator 120-5 may perform a CRT calculation like process 13 of the CRT-RSA algorithm shown in FIG. 8, or like process 13 of the CRT-RSA algorithm shown in FIG. 10.

For example, the CRT calculator 120-5 may be used to calculate a thirteenth calculation value S and a fourteenth calculation value S' using the input information and the intermediate calculation information stored in the register block 120-1 based (e.g.,) on the calculations: $S=CRT_{FA}(R_{s_p}, R_{s_q})=m^d-(d'_p \oplus d'_q) \bmod N$ and $S'=CRT_{FA}(R'_{s_p}, R'_{s_q})=m^{d-1}-(d'_p \oplus d'_q) \bmod N$, similar to the process 13 of the CRT-RSA algorithm shown in FIG. 8.

As another example, the CRT calculator 120-5 may be sued to calculate a thirteenth calculation value S and a fourteenth calculation value S' based on calculations: $S=CRT_{FA}(R_{s_p}, R_{s_q})=m^d-T_d \bmod N$ and $S'=CRT_{FA}(R'_{s_p}, R'_{s_q})=m^{d-1}-T_d \bmod N$ like the process 13 of the CRT-RSA algorithm shown in FIG. 10 using the input information and the intermediate calculation information stored in the register block 120-1.

The encryption result calculator 120-6 may be used to calculate an encryption result obtained by comparing determination operation based on the CRT calculation results. For example, the encryption result calculator 120-6 may be used to perform processes 15, 16, and 17 in the CRT-RSA algorithm listed in FIG. 8 or the CRT-RSA algorithm listed in FIG. 10.

The encryption result calculator 120-6 may be used to perform a comparing determination process in relation to the input information and intermediate calculation information stored in the register block 120-1, like the process 15 in the CRT-RSA algorithm listed in FIG. 8. For example, when the condition: $(S+T_d) \neq m-(S'+S_{d_{pq}})$ is satisfied, the encryption result calculator 120-6 may determine that there is an error has occurred in the encryption process. However, upon determining that no error has occurred in the process 15 of FIG. 8, the encryption result calculator 120-6 may output an encrypted result S after performing the calculation process 16 in the CRT-RSA algorithm listed in FIG. 8.

The encryption result calculator 120-6 may perform a comparing determination process using the input information and intermediate calculation information stored in the register block 120-1 as in the process 15 of the CRT-RSA algorithm listed in FIG. 10. For example, when the condition: $(S+T_d) \bmod t_p t_q \neq m \cdot (S'+S_{d_{pq}}) \bmod t_p t_q$ is satisfied, the encryption result calculator 120-6 may determine that an error has occurred in the encryption process. However, upon determining that no error has occurred in the process 15 of FIG. 10, the encryption result calculator 120-6 may perform a calculation process such as process 16 so as to calculate and output an encrypted result S.

Next, a CRT-RSA encryption method according to an embodiment of the inventive concept perform in the electronic device 100 of FIG. 1 will be described with reference to the method flowchart of FIG. 3.

The electronic device 100 performs an operation of calculating first parameter information and second parameter information that will be used in at least one modular exponentiation calculation process based on a modular calculation result of a secret key that is obtained using Euler's phi function values with respect to two different prime numbers calculated using a public key (S110).

For example, the electronic device 100 may respectively determine $d_p$ and $d_q$ according to the equations: $d_p = d \bmod (p-1)$ and $d_q = d \bmod (q-1)$ as the first parameter information and second parameter information. Here, denotes a secret key, 'p' and 'q' are prime numbers, and a public key N satisfies the condition (N=p times q).

Otherwise, $d'_p$ and $d'_q$—as respectively calculated intermediate calculation information derived from $d_p$ and $d_q$—may be determined as the first parameter information and second parameter information. Here, $d'_p$ may be determined as first intermediate calculation information derived from $d_p$ using both $d_p$ and $d_q$, while and $d'_q$ may be determined as second intermediate calculation information derived from $d_q$ using both $d_p$ and $d_q$.

For example, $d'_p$ and $d'_q$ may be calculated by the calculation process shown in process 3 in the CRT-RSA algorithm of FIG. 8. That is, $d'_p$ (and $d'_q$ similarly) may be determined by calculating equations $d'_p$ and $d'_q = (\Psi_d \oplus d_p) \& d_q$. Otherwise, $d'_p$ and $d'_q$ may be obtained through the calculation in the process 3 in the CRT-RSA algorithm of FIG. 10. Those skilled in the art will recognize that d'$_p$ and d'$_q$ may be variously calculated from d$_p$ and d$_q$.

Next, the electronic device 100 performs an operation of a modular exponential calculation process with respect to a "next block" based on calculation information for a "previous block", wherein the these sequentially processed blocks are respectively divided from the first parameter information and second parameter information (S120). For example, the first parameter information and second parameter information may be respectively divided into two blocks, and the modular exponential calculation with respect to the next block may be performed using at least one of the intermediate calculation information and calculation information of a previous block for each one of the defined blocks. In certain embodiments of the inventive concept, the first parameter information and second parameter information may be respectively divided into two blocks having the same size.

Next, the electronic device 100 performs an operation of calculating an encryption result based on the CRT calculation using the modular exponential calculation result (S130). For example, an error may be detected by the comparing determination process in the operation of calculating the encryption result.

Figure 3:
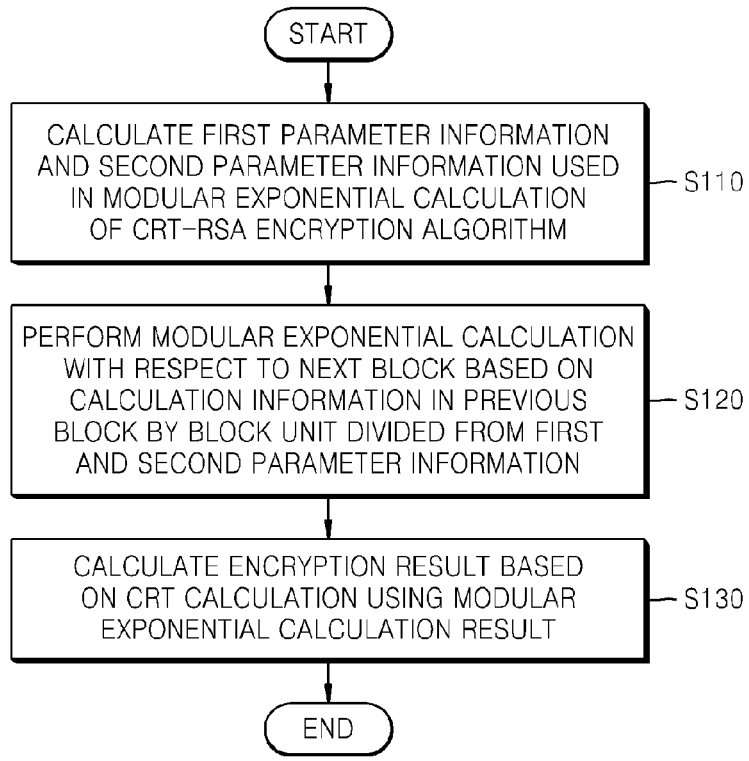
FIG. 3 is a general flowchart summarizing a CRT-RSA method according to certain embodiments of the inventive concept.
Figure 4:
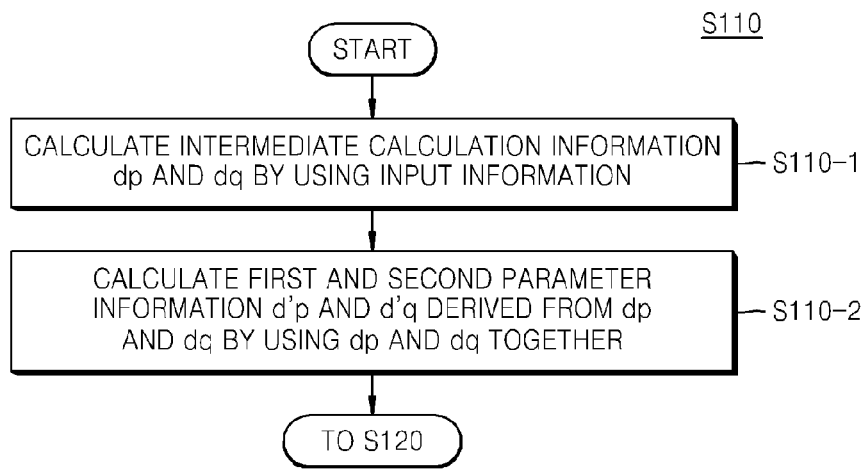
FIG. 4 is a flowchart further illustrating in one example the step calculating the first and second parameter information in the method of FIG. 3.

FIG. 4 is a flowchart further illustrating in one example the step of calculating the first and second parameter information (S110) in the method of FIG. 3.

The electronic device 100 performs an operation of calculating intermediate calculation information d$_p$ and d$_q$ based on the equation: d$_p$=d mod(p−1) and d$_q$=d mod(q−1) using input information (S110-1). For example, the electronic device 100 may performs an operation respectively calculating the first parameter information d'$_p$ and second parameter information d'$_q$ as derived from the intermediate calculation information d$_p$ and d$_q$ using the intermediate calculation information d$_p$ and d$_q$ (S110-2). Thus, the first parameter information d'$_p$ and second parameter information d'$_q$ may be calculated using the process 3 in the CRT-RSA algorithm listed in FIG. 8 or FIG. 10.

Figure 5:
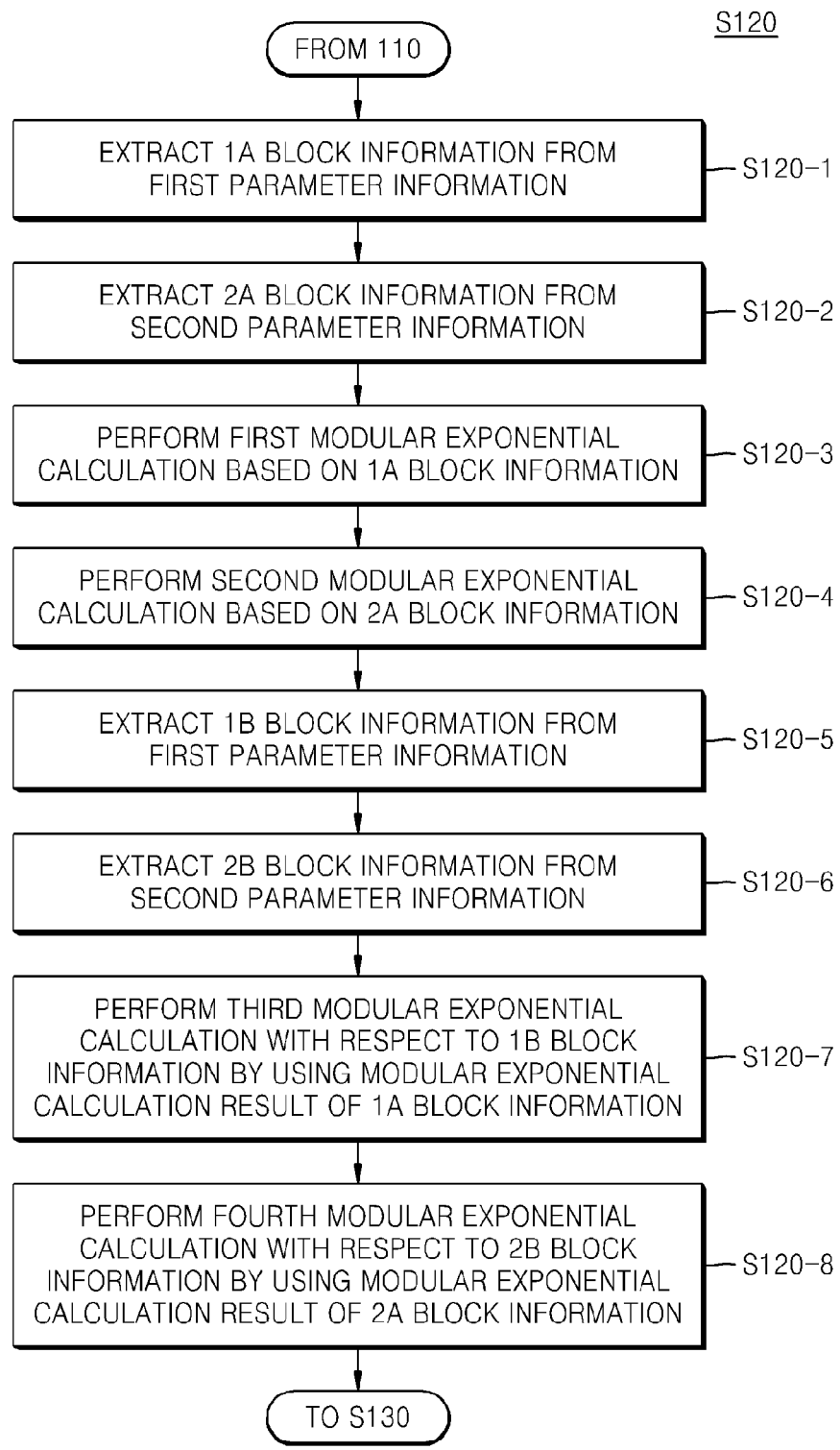
FIG. 5 is a flowchart further summarizing in one example the step of performing modular exponential operation in the method of FIG. 3.

FIG. 5 is a flowchart further illustrating in one example the modular exponential calculation process S120 of the method of FIG. 3.

The electronic device 100 may be used to performs the operation of extracting 1A block information from the first parameter information d'$_p$ (S120-1). The electronic device 100 may also be used to extract the 1A block information from the first parameter information d'$_p$ using a LEFTB function. For example, the 1A block information L'$_{d_p}$ may be calculated from the first parameter information d'$_p$ of an n-bit length by using an equation:

$$L'_{d_p} = LeftB(d'_p) = \sum_{i=\frac{n}{2}}^{n-1} d'_{p_i} 2^{i-\frac{n}{2}} = \left(d'_{p_{n-1}}, d'_{p_{n-2}}, \ldots, d'_{p_{\frac{n}{2}}}\right)_2.$$

In addition, the electronic device 100 may be used to perform the operation of extracting 2A block information from the second parameter information d'$_q$ (S120-2). The electronic device 100 may be used to extract the 2A block information from the second parameter information d'$_q$ using the LEFTB function. For example, the 2A block information L'$_{d_q}$ may be calculated from the second parameter information d'$_q$ of the n-bit length by using an equation:

$$L'_{d_q} = LeftB(d'_q) = \sum_{i=\frac{n}{2}}^{n-1} d'_{q_i} 2^{i-\frac{n}{2}} = \left(d'_{q_{n-1}}, d'_{q_{n-2}}, \ldots, d'_{q_{\frac{n}{2}}}\right)_2.$$

Next, the electronic device 100 may be sued to perform a first modular exponential calculation based on the 1A block information (S120-3). For example, a first calculation value L$_{s_p}$ and a second calculation value L'$_{s_p}$ resulting from the modular exponential calculation of the 1A block information L'$_{d_p}$ divided from the first parameter information d'$_q$ may be calculated by using equations: L$_{s_p}$=m$^{LeftB(d'_p)+1}$ mod sp and L'$_{s_p}$=m$^{LeftB(d'_p)}$ mod sp. Here, 'm' is a message to be encrypted, 's' is a random number, and 'p' is a prime number. Also, a third calculation value CK$_{L_p}$ may be further calculated by using an equation: CK$_{L_p}$=LeftB(d'$_p$)⊕p'. Here, p' is intermediate calculation information derived from p by a calculation using the input information s, and p and q, s is a random number, p and q are prime numbers, and the public key N satisfies the condition (N=p times q). For example, p' may be determined using the equation: p'=(Ψ$_{pq}$⊕q)+(s−1)p, where Ψ$_{pq}$ is determined using the equation Ψ$_{pq}$=p⊕q.

In addition, the electronic device 100 may be used to performs a second modular exponential calculation based on the 2A block information (S120-4). For example, a fourth calculation value L$_{s_q}$ and a fifth calculation value L'$_{s_q}$ that are results of performing a modular exponential calculation with respect to the 2A block information L'$_{d_q}$ that is divided from the second parameter information d'$_q$ may be calculated by using equations: L$_{s_q}$=m$^{LeftB(d'_q)+1}$ mod$_{s_q}$ and L'$_{s_q}$=m$^{LeftB(d'_q)}$ mod$_{s_q}$. Also, a sixth calculation value CK$_{L_q}$ may be further calculated by using the equation: CK$_{L_q}$=LeftB(d'$_q$)⊕q'. Here, q' is intermediate calculation information derived from q by the calculation using s, p, and q. For example, q' may be determined using the equation: q'=(Ψ$_{pq}$⊕p)+(s−1)q, where Ψ$_{pq}$ is determined by the equation: Ψ$_{pq}$=p⊕q.

Next, the electronic device 100 may be used to performs an operation of extracting 1B block information from the first parameter information d'$_p$, except for the 1A block information L'$_{d_p}$ (S120-5). For example, the 1B block information R'$_{d_p}$ may be calculated from the first parameter information d'$_p$ of the n-bit length based on an equation $$R'_{d_p} = (\Psi_d \oplus d'_q) - t'_{d_p} \cdot 2^{\frac{n}{2}}.$$

Here, Ψ$_d$ may be determined based on d$_p$ and d$_q$, where d$_p$ and d$_q$ may be determined respectively by equations d$_p$=d mod(p−1) and d$_q$=d mod(q−1), and t'$_{d_p}$ may be determined based on the 1A block information and the intermediate calculation information. Here, Ψ$_d$ is a calculation result of d$_p$⊕d$_q$, t'$_{d_p}$ may be determined by an equation t'$_{d_p}$=L'$_{d_p}$&(CK$_{L_p}$⊕p'), and CK$_{L_p}$ may be determined by an equation CK$_{L_p}$.

In addition, the electronic device 100 may be used to perform an operation of extracting 2B block information from the second parameter information d'$_q$, except for the 2A block information L'$_{d_q}$ (S120-6). For example, the 2B block information R'$_{d_q}$ may be calculated from the second parameter information d'$_q$ of the n-bit length by using an equation $$R'_{d_q} = (\Psi_d \oplus d'_p) - t'_{d_q} \cdot 2^{\frac{n}{2}}.$$

Here, $\Psi_d$ may be determined based on $d_p$ and $d_q$, where $d_p$ and $d_q$ may be determined respectively using the equations: $d_p = d \bmod(d-1)$, and $d_q = d \bmod(q-1)$, and $t'_{d_p}$ may be determined based on the 1A block information and the intermediate calculation information. For example, $\Psi_d$ is a calculation result of $d_p \oplus d_q$, $t'_{d_q}$ may be determined by the equation: $t'_{d_q} = L'_{d_q} \& (CK_{L_q} \oplus q')$, and $CK_{L_q}$ is determined by the equation: $CK_{L_q} = LeftB(d'_q) \oplus q'$.

Next, the electronic device 100 may be used to perform a third modular exponential calculation based on the 1B block information by using the modular exponential calculation result of the 1A block information (S120-7). For example, a seventh calculation value $R_{s_p}$ and an eighth calculation value $R'_{s_p}$ may be obtained by performing a modular exponential calculation with respect to the 1B block information $R'_{d_p}$ that is obtained by using the first and second calculation values $L_{s_p}$ and $L'_{s_p}$, that is, the modular exponential calculation information about the 1A block information $L'_{d_p}$, by using equations $R_{s_p} = m^{d'_p} \bmod sp$ and $R'_{s_p} = m^{d'_p - 1} \bmod sp$. Also, a ninth calculation value $CK_{R_p}$ may be further calculated using the equation:

$$CK_{R_p} = \left(\sum_{i=0}^{\frac{n}{2}-1} d'_{p_i} \cdot 2^i\right) \oplus p'.$$

Similarly, the electronic device 100 may be used to perform a fourth modular exponential calculation based on the 2B block information by using the modular exponential calculation result with respect to the 2A block information (S120-8). For example, a tenth calculation value $R_{s_q}$ and an eleventh calculation value $R'_{s_q}$ may be obtained by performing a modular exponential calculation with respect to the 2B block information $R'_{s_q}$ that is obtained through the modular exponential calculation using the fourth and fifth calculation values $L_{s_q}$ and $L'_{s_q}$, that is, the modular exponential calculation information about the 2A block information $L'_{d_q}$, based on the equations: $R_{s_q} = m^{d'_q} \bmod sq$ and $R'_{s_q} = m^{d'_q - 1} \bmod sq$. Also, a twelfth calculation value $CK_{R_q}$ may be further obtained using the equation:

$$CK_{R_q} = \left(\sum_{i=0}^{\frac{n}{2}-1} d'_{q_i} 2^i\right) \oplus q'.$$

Figure 6:
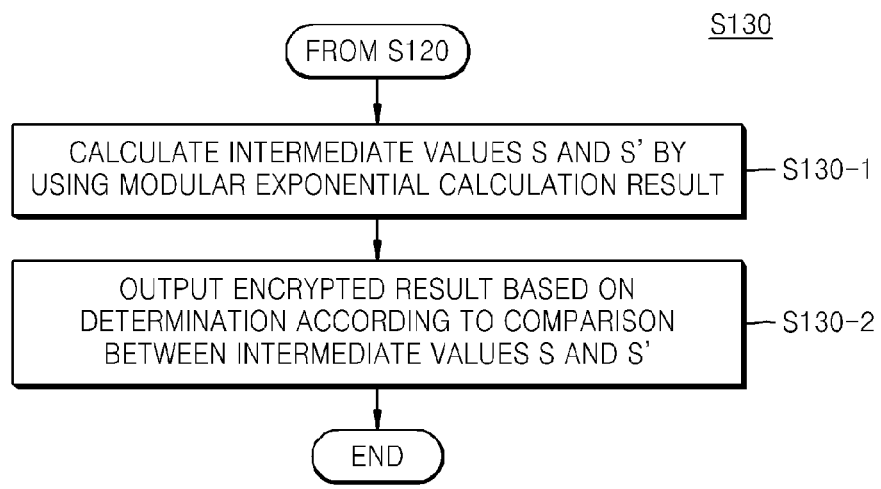
FIG. 6 is a flowchart further illustrating in one example the step of calculating an encryption processing result in the method of FIG. 3.

FIG. 6 is a flowchart further illustrating in one example the step of calculating an encryption process S130 in the method of FIG. 3.

The electronic device 100 may be used to calculate the thirteenth calculation value S and the fourteenth calculation value S' using the equations: $S = CRT_{FA}(R_{s_p}, R_{s_q}) = m^d - (d'_p \oplus d'_q) \bmod N$ and $S' = CRT_{FA}(R'_{s_p}, R'_{s_q}) = m^{d-1} - (d'_p \oplus d'_q) \bmod N$ that use the modular exponential calculation results (S130-1). Here, $R_{s_p}$ and $R'_{s_p}$ are values obtained during the modular exponential calculation process based on the first parameter information $d'_p$ and $R_{s_q}$ and $R'_{s_q}$ are values obtained during the modular exponential calculation process based on the second parameter information $d'_q$.

Consistent with this approach, the electronic device 100 will provide an encrypted result based on a determination using a comparison process for the thirteenth and fourteenth calculation values S and S' (S130-2). The comparison and determination process may be performed as in the process 15 in the CRT-RSA algorithm of FIG. 8. For example, if it is determined that the condition $(S + T_d) \neq m \cdot (S + S_{d_{pq}})$ is satisfied, it may be determined that there an error has occurred in the encryption process. However, if it is determined that no error has occurred in the process 15 of the FIG. 8, the encryption result calculator 120-6 may perform the calculation process 16 in order to provide encrypted result S.

Figure 7:
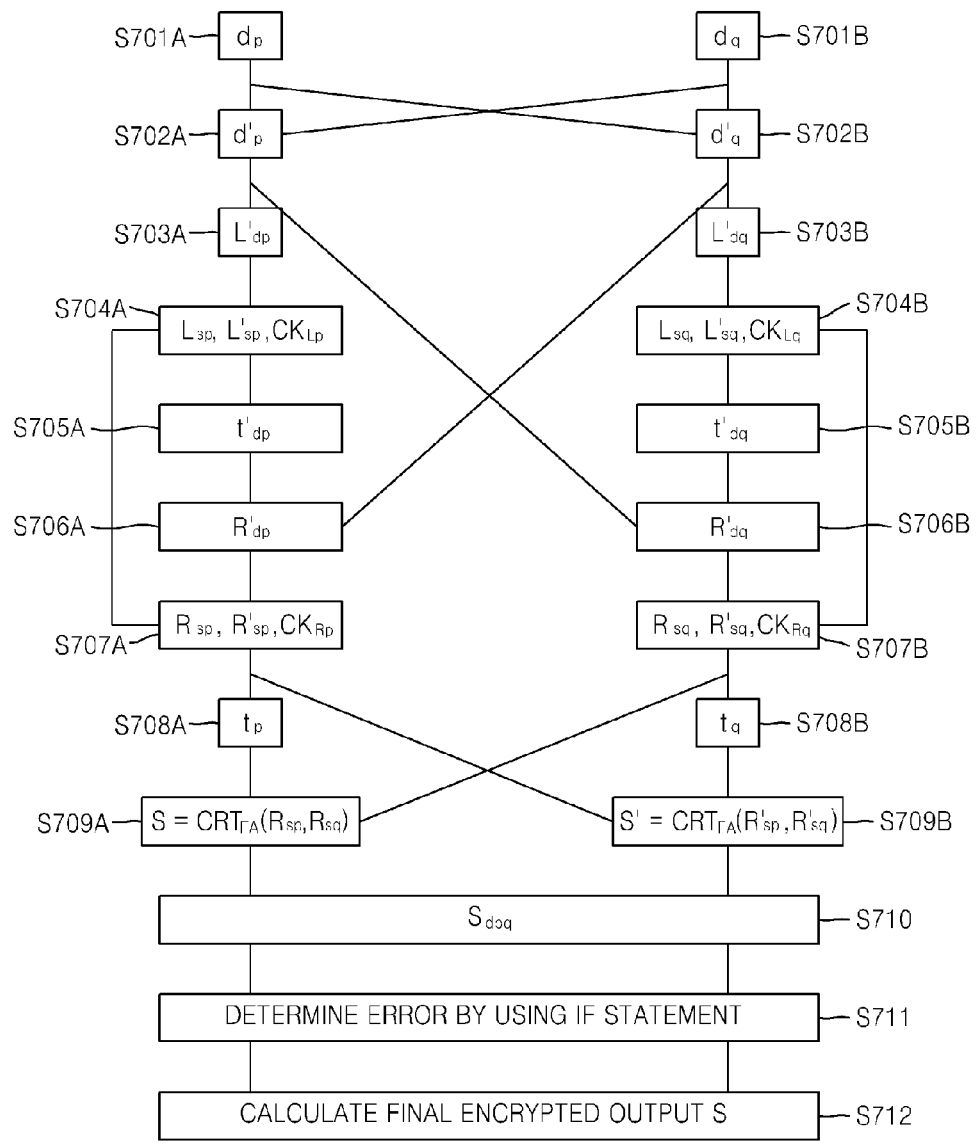
FIG. 7 is a conceptual diagram illustrating certain main processes in an CRT-RSA encryption method according to embodiments of the inventive concept.

FIG. 7 is a conceptual diagram illustrating relationships between main processes of a CRT-RSA encryption method according to certain embodiments of the inventive concept. That is, FIG. 7 illustrates processes whereby a CRT-RSA encryption approach may be performed using a Feistel structure.

In operations S701A and S701B, $d_p$ and $d_q$ are respectively calculated by using equations: $d_p = d \bmod(p-1)$ and $d_q = d \bmod(q-1)$.

In operation S702A, first parameter information $d'_p$ is calculated using the values of $d_p$ and $d_q$. Accordingly, if a fault is injected to any one of $d_p$ and $d_q$, the fault may be diffused to the first parameter information $d'_p$.

In operation S702B, second parameter information $d'_q$ is calculated using the values of $d_p$ and $d_q$. Accordingly, if a fault is injected to any one of $d_p$ and $d_q$, the fault may be diffused to the second parameter information $d'_q$.

In operation S703A, the 1A block information $L'_{d_p}$ is obtained from the first parameter information $d'_p$ by using the equation:

$$L'_{d_p} = LeftB(d'_p) = \sum_{i=\frac{n}{2}}^{n-1} d'_{p_i} 2^{i-\frac{n}{2}} = \left(d'_{p_{n-1}}, d'_{p_{n-2}}, \ldots, d'_{p_{\frac{n}{2}}}\right)_2.$$

In operation S703B, the 2A block information $L'_{d_q}$ is obtained from the second parameter information by using the equation:

$$L'_{d_q} = LeftB(d'_q) = \sum_{i=\frac{n}{2}}^{n-1} d'_{q_i} 2^{i-\frac{n}{2}} = \left(d'_{q_{n-1}}, d'_{q_{n-2}}, \ldots, d'_{q_{\frac{n}{2}}}\right)_2.$$

In operation S704A, a pair of intermediate values $L_{s_p}$, $L'_{s_p}$, as well as $CK_{L_p}$ are calculated by performing the modular exponential calculation based on the 1A block information $L'_{d_p}$ and initial value information.

In operation S704B, another pair of intermediate values $L_{s_q}$, $L'_{s_q}$, as well as $CK_{L_q}$ are calculated by performing the modular exponential calculation based on the 2A block information $L'_{d_q}$ and initial value information.

In operation S705A, an intermediate value $t'_{d_p}$ is calculated based on the 1A block information $L'_{d_p}$ and the initial value information.

In operation S705B, an intermediate value $t'_{d_q}$ is calculated based on the 2A block information $L'_{d_q}$ and the initial value information.

In operation S706A, the 1B block information $R'_{d_p}$ is calculated based on the 1A block information $L'_{d_p}$, the intermediate value $t'_{d_p}$, and the second parameter information $d'_q$. Accordingly, if a fault is injected to any one of the first parameter information $d'_p$ and the second parameter information $d'_q$, the fault may be diffused to the 1B block information $R'_{d_p}$. Also, if the fault is injected to the initial value or the intermediate values that are used to calculate the intermediate value $t'_{d_p}$, the fault may be diffused to the 1B block information $R'_{d_p}$.

In operation S706B, the 2B block information $R'_{d_q}$ is calculated based on the 2A block information $L'_{d_q}$, the intermediate value $t'_{d_q}$, and the first parameter information $d'_p$. Accordingly, if a fault is injected to any one of the first parameter information $d'_p$ and the second parameter information $d'_q$, the fault may be diffused to the 2B block information $R'_{d_q}$. Also, if the fault is injected to the initial value or the intermediate values that are used to calculate the intermediate value $t'_{d_q}$, the fault may be diffused to the 2B block information $R'_{d_q}$.

In operation S707A, another pair of intermediate values $R_{s_p}$, $R'_{s_p}$, as well as $CK_{R_p}$ are calculated by performing the modular exponential calculation based on the modular exponential calculation information of the 1A block information $L'_{d_p}$, the 1B block information $R'_{d_p}$, and the initial value information.

In operation S707B, another pair of intermediate values $R_{s_q}$, $R'_{s_q}$, as well as $CK_{R_q}$ are calculated by performing the modular exponential calculation based on the modular exponential calculation information about the 2A block information, the 2B block information, and the initial value information.

In operation S708A, an intermediate value $t_p$ is calculated by using the initial value and previous intermediate values. For example, the intermediate value $t_p$ may be calculated by using an equation $$t_p = (t_{pq}+p) - p'-q' = p'+q'+p-p'-q' = p$$

In operation S708B, an intermediate value $t_q$ is calculated by using the initial value and previous intermediate values. For example, the intermediate value $t_q$ may be calculated by using an equation $$t_q = (T_{pq}+q) - p'-q' = p'+q'+q-p'-q' = q$$

In operation S709A, an intermediate value S is calculated by performing a CRT calculation using $R_{s_p}$ calculated in operation S707A and $R_{s_q}$ calculated in operation S707B. Accordingly, if a fault is injected during the calculating of one of $R_{s_p}$ and $R_{s_q}$, the fault may be diffused to the intermediate value S.

In operation S709B, an intermediate value S' is calculated by performing a CRT calculation using $R'_{s_p}$ calculated in operation S707A and $R'_{s_q}$ calculated in operation S707B. Accordingly, if a fault is injected during the calculating of one of $R'_{s_p}$ and $R'_{s_q}$, the fault may be diffused to the intermediate value S'.

In operation S710, an intermediate value $S_{d_{pq}}$ is calculated by using intermediate values derived from the initial values p and q.

In operation S711, a determination is made as to whether or not an error has been introduced during the encryption processes using the intermediate values. For example, it may be determined whether there is an error in the encryption processes using an "if statement", such as If $((S+T_d) \neq m \cdot (S'+S_{d_{pq}}))$ then Return(error).

In operation S712, where it is determined that no error has been introduced into the determination result in operation S711, a final output value S is calculated by using the intermediate values S and S' and other previous intermediate values.

Due to the CRT-RSA encryption process including the Feistel structure as described above, if a fault is injected to the initial value or the intermediate values, the fault is randomly diffused to subsequent calculation processes of the intermediate values and the output value. Accordingly, even if the operation S711 is deleted, the secret values p and q will not be revealed.

As already noted, FIG. 8 is a listing of inputs, outputs and exemplary processes related to a CRT-RSA algorithm according to embodiments of the inventive concept.

Input information in the CRT-RSA algorithm shown in FIG. 8 includes p, q, $d_p$, $d_q$, $I_p$ (where $I_p = p^{-1}$ mod q), a message 'm', $T_d$, where $T_d$ is equal to a direct sum of $d_p$ and $d_q$ and $T_{pd}$, where $T_{pd}$ is equal to a direct sum of p and q, and output information is S ($=m^d$ mod N). Here, 'p' and 'q' are prime numbers, and a public key N satisfies the condition (N=p times q). In addition, $d_p$ and $d_q$ are information generated by the equations: $d_p=d \mod(p-1)$, and $d_q=d \mod(q-1)$, where 'd' is a secret key.

In FIGS. 8 and 10, the symbol '&' is used to denote a logical AND operation, the symbol, '⊕' denotes an logical XOR operation bit unit, and the symbol '||' denotes a concatenation operation.

An algorithm shown in FIG. 9 may be applied as a PMExp algorithm used in processes 5, 7, 10, and 11 in order to deal with power attacks and fault attacks.

If there is no fault injected in the CRT-RSA algorithm shown in FIG. 8, processes 1 through 17 may be calculated as follows.

First, in the process 2, the intermediate values p', q' and $T_{pq}$ corresponding to intermediate calculation information are calculated using equations 1 through 3.

$$p' = (\Psi_{pq} \oplus q) + (s-1)p \quad (1)$$

$$q' = (\Psi_{pq} \oplus p) + (s-1)q \quad (2)$$

$$T_{pq} = sp + sq \quad (3)$$

Next, in the process 3, the first parameter $d'_p$ and the second parameter $d'_q$ are calculated using equations 4 and 5.

$$d'_p = (\Psi_d \oplus d_q) \& d_p \quad (4)$$

$$d'_q = (\Psi_d \oplus d_p) \& d_q \quad (5)$$

Next, in the process 4, the 1A block information $L'_{d_p}$ and the 2A block information are calculated using equations 6 and 7.

$$L'_{d_p} = LeftB(d'_p) = \sum_{i=\frac{n}{2}}^{n-1} d'_{p_i} 2^{i-\frac{n}{2}} = \left(d'_{p_{n-1}}, d'_{p_{n-2}}, \ldots, d'_{p_{\frac{n}{2}}}\right)_2 \quad (6)$$

$$L'_{d_q} = LeftB(d'_q) = \sum_{i=\frac{n}{2}}^{n-1} d'_{q_i} 2^{i-\frac{n}{2}} = \left(d'_{q_{n-1}}, d'_{q_{n-2}}, \ldots, d'_{q_{\frac{n}{2}}}\right)_2 \quad (7)$$

Then, in the process 5, a pair of intermediate values $L_{s_p}$, $L'_{s_p}$ as well as $CK_{L_p}$ are calculated using equations 8, 9, and 10.

$$L_{s_p} = m^{L'd_p+1} = m^{LeftB(d'_p)+1} \mod sp \quad (8)$$

$$L'_{s_p} = m^{LeftB(d'_p)} \mod sp = \quad (9)$$

$$CK_{L_p} = LeftB(d'_p) \oplus p' \quad (10)$$

Next, in the process 6, the intermediate value $t'_{d_p}$ is calculated using equation 11.

$$t'_{d_p} = L'_{d_p} \& (CK_{L_p} \oplus p') = LeftB(d'_p) \quad (11)$$

In addition, another pair of intermediate values $L_{s_q}$, $L'_{s_q}$ as well as $CK_{L_q}$ are calculated using equations 12, 13, and 14 in the process 7.

$$L_{s_q} = m^{L'd_q+1} = m^{LeftB(d'_q)+1} \mod sq \tag{12}$$

$$L'_{s_q} = m^{L'd_q} = m^{LeftB(d'_q)} \mod sq \tag{13}$$

$$CK_{L_q} = LeftB(d'_q) \oplus q' \tag{14}$$

In the process 8, the intermediate value $t'_{d_q}$ is calculated using equation 15.

$$t'_{d_q} = L'_{d_q} \& (CK_{L_q} \oplus q') = LeftB(d'_q) \tag{15}$$

Next, in the process 9, the 1B block information $R'_{d_p}$ and the 2B block information $R'_{d_q}$ are calculated using equations 16 and 17.

$$R'_{d_p} = (\Psi_d \oplus d'_q) - t'_{d_q} \cdot 2^{\frac{n}{2}} =$$
$$d'_p - LeftB(d'_p) \cdot 2^{\frac{n}{2}} = \sum_{i=0}^{\frac{n}{2}-1} d_{p_i} 2^i = RightB(d'_p) \tag{16}$$

$$R'_{d_q} = (\Psi_d \oplus d'_p) - t'_{d_p} \cdot 2^{\frac{n}{2}} =$$
$$d'_q - LeftB(d'_q) \cdot 2^{\frac{n}{2}} = \sum_{i=0}^{\frac{n}{2}-1} d_{q_i} 2^i = RightB(d'_q) \tag{17}$$

Then, in the process 10, another pair of intermediate values $R_{s_p}$, $R'_{s_p}$, as well as $CK_{R_p}$ are calculated using equations 18, 19, and 20.

$$R_{s_p} = m^{d'_p} \mod sp \tag{18}$$

$$R'_{s_p} = m^{d'_p - 1} \mod sp \tag{19}$$

$$CK_{R_p} = \left( \sum_{i=0}^{\frac{n}{2}-1} d'_{p_i} \cdot 2^i \right) \oplus p' \tag{20}$$

Next, in the process 11, another pair of intermediate values $R_{s_q}$, $R'_{s_q}$, as well as $CK_{R_q}$ are calculated using equations 21, 22, and 23.

$$R_{s_q} = m^{d'_q} \mod sq \tag{21}$$

$$R'_{s_q} = m^{d'_q - 1} \mod sq \tag{22}$$

$$CK_{R_q} = \left( \sum_{i=0}^{\frac{n}{2}-1} d'_{q_i} 2^i \right) \oplus q' \tag{23}$$

Next, in the process 12, the intermediate values $t_p$ and $t_q$ are calculated using equations 24 and 25.

$$t_p = (T_{pq} + p) - p' - q' = p' + q' + p - p' - q' = p \tag{24}$$

$$t_q = (T_{pq} + q) - p' - q' = p' + q' + q - p' - q' = q \tag{25}$$

In the process 13, the intermediate values S and S' are obtained by performing CRT calculations using equations 26 and 27.

$$S = CRT_{FA}(R_{s_p}, R_{s_q}) = m^d - (d'_p \oplus d'_q) \mod N \tag{26}$$

$$S' = CRT_{FA}(R'_{s_p}, R'_{s_q}) = m^{d-1} - (d'_p \oplus d'_q) \mod N \tag{27}$$

In the process 14, the intermediate value $S_{d_{pq}}$ is calculated using equation 28.

$$S_{d_{pq}} = (t'_p \| (CK_{R_p} \oplus p')) \oplus (t'_{d_q} \| (CK_{R_q} \oplus q')) = d'_p \oplus d'_q \tag{28}$$

In addition, if $(S+T_d) + m \cdot (S' + S_{d_{pq}})$ is determined as a determination result in the process 15, the output S is calculated using equation 29 in the process 16.

$$S = (S + \Psi_d) \& m \cdot (S' + S_{d_{pq}}) \mod t_p t_q = (m^d - (d'_p \oplus d'_q) + \Psi_d) \& \tag{29}$$
$$m \cdot (m^{d-1} - (d'_p \oplus d'_q) + S_{d_{pq}}) \mod N = m^d \mod N$$

As described above, a modulus random blinding method using the fault diffusion is provided in embodiments of the inventive concept, and may be applied safely to power analysis and electric wave analysis. Also, even if a fault attack for skipping the "if statement" in the process 15 is performed, a result value—in which a fault has been assumedly injected, is output through the fault diffusion when the fault is injected during calculating in each step. Therefore, the attacker may not identify the secret value using the result value in which a fault has been injected.

That is, in a case where a fault is injected, the fault is diffused to the intermediate calculation processes, and thus, the output value, in which the fault is injected, is output and the secret value may not be identified.

FIG. 10 is a diagram illustrating another example of a CRT-RSA algorithm according to an embodiment of the inventive concept.

The example of the CRT-RSA algorithm shown in FIG. 10 modifies calculation equations for obtaining intermediate values $p'$, $q'$, $T_d$, $t_{d_p}$, $t_{d_q}$, and $t_p$ from the example of the CRT-RSA algorithm shown in FIG. 8.

Input information in the CRT-RSA algorithm of FIG. 10 includes p, q, $d_p$, $d_q$, $I_p$ (=$p^{-1}$ mod q), message m, $\Psi_d$ (=$d_p \oplus d_q$) and $\Psi_{pq}$ (=$p \oplus q$), and output information is S (=$m^d$ mod N). Here, p and q are prime numbers, and a public key N satisfies a condition of N=p·q. In addition, $d_p$ and $d_q$ are respectively information generated based on equations $d_p$=d mod(p−1), and $d_q$=d mod(q−1), and d denotes a secret key.

An algorithm shown in FIG. 9 may be applied as a PMExp algorithm used in processes 5, 7, 10, and 11 in order to deal with power attacks and fault attacks.

If there is no fault injected in the CRT-RSA algorithm shown in FIG. 10, processes 1 through 17 may be calculated as follows.

First, in process 2, intermediate values $p'$, $q'$, and $T_d$ are calculated using equations 30 through 32.

$$p' = (\Psi_{pq} \oplus q) \& p = p \tag{30}$$

$$q' = (\Psi_{pq} \oplus p) \& q = q \tag{31}$$

$$T_d = (d_p + d_q) + s(p + q - 2) \tag{32}$$

Next, in process 3, a first parameter $d'_p$ and a second parameter $d'_q$ are calculated using equations 33 and 34.

$$d'_p = ((\Psi_d \oplus d_q) \& d_p) + s(p-1) = d_p + s(p-1) \tag{33}$$

$$d'_q = ((\Psi_d \oplus d_p) \& d_q) + s(q-1) = d_q + s(q-1) \tag{34}$$

In process 4, 1A block information $L'_{d_p}$ and 2A block information $L'_{d_q}$ are calculated using equations 6 and 7 described above.

In process 5, a pair of intermediate values $L_{s_p}$, $L'_{s_p}$, as well as $CK_{L_p}$ are calculated using equations 8, 9, and 10 described above.

In process 6, an intermediate value $t_{d_p}$ is calculated using equation 35.

$$t_{d_p} = CK_{L_p} \oplus p' = \text{LeftB}(d'_p) \quad (35)$$

In process 7, another pair of intermediate values $L_{s_q}$, $L'_{s_q}$, as well as $CK_{L_q}$ are calculated using equations 12, 13, and 14 described above.

In process 8, an intermediate value $t_{d_q}$ is calculated using equation 36.

$$t_{d_q} = CK_{L_p} \oplus q' = \text{LeftB}(d'_q) \quad (36)$$

In process 9, 1B block information $R'_{d_p}$ and 2B block information $R'_{d_q}$ are calculated using equations 37 and 38.

$$R'_{d_p} = (T_d - d'_q) - t_{d_p} \cdot 2^{\frac{n}{2}} = \quad (37)$$
$$d'_p - \text{LeftB}(d'_p) \cdot 2^{\frac{n}{2}} = \sum_{i=0}^{\frac{n}{2}-1} d'_{p_i} 2^i = \text{RightB}(d'_p)$$

$$R'_{d_q} = (T_d - d'_p) - t_{d_q} \cdot 2^{\frac{n}{2}} = \quad (38)$$
$$d'_p - \text{LeftB}(d'_q) \cdot 2^{\frac{n}{2}} = \sum_{i=0}^{\frac{n}{2}-1} d_{q_i} 2^i = \text{RightB}(d'_q)$$

In process 10, another pair of intermediate values $R_{s_p}$, $R'_{s_p}$, as well as $CK_{R_p}$ are calculated using the equations 18, 19, and 20 described above.

In process 11, another pair of intermediate values $R_{s_q}$, $R'_{s_q}$, as well as $CK_{R_q}$ are calculated using the equations 21, 22, and 23 described above.

In process 12, intermediate values $t_p$ and $t_q$ are calculated using equations 39 and 40.

$$t_p = \Psi_{pq} \oplus q' = p \quad (39)$$

$$t_q = \Psi_{pq} \oplus p' = q \quad (40)$$

In process 13, intermediate values S and S' are calculated by performing CRT calculations using equations 41 and 42.

$$S = \text{CRT}_{FA}(R_{s_p}, R_{s_q}) = m^d - T_d \bmod N \quad (41)$$

$$S' = \text{CRT}_{FA}(R'_{s_p}, R'_{s_q}) = m^{d-1} - T_d \bmod N \quad (42)$$

In process 14, an intermediate value $S_{d_{pq}}$ is calculated using equation 43.

$$S_{d_{pq}} = (t_{d_p} \| (CK_{R_p} \oplus p)) + (t_{d_q} \| (CK_{R_q} \oplus q)) = d'_p + d'_q = T_d \quad (43)$$

Next, if a determination result of process 15 is $(S+T_d) \bmod t_p t_q = m \cdot (S' + S_{d_{pq}}) \bmod t_p t_q$, an output S is calculated using equation 44 in process 16.

$$S = (S + T_d) \& m \cdot (S' + S_{d_{pq}}) \bmod t_p t_q = (m^d - (d'_p + d'_q) + T_d) \& \quad (44)$$
$$m \cdot (m^{d-1} - (d'_p + d'_q) + S_{d_{pq}}) \bmod N = m^d \bmod N$$

As described above, even if a fault attack designed to skip the "if statement" in the process 15 is performed, a result value, in which the fault is injected, is output through the fault diffusion when the fault is injected during calculating in each step. Therefore, the attacker may not find out the secret value by using the result value in which the fault is injected.

For example, if the attacker deforms $d_p$ in the process 3 of the algorithm shown in FIG. 10, $\widetilde{a_p}$ and $\widetilde{a_q}$ to which the fault is diffused may be calculated using equations 45 and 46.

$$\widetilde{a_p} = ((\Psi_d \oplus d_q) \& \widetilde{a_p}) + s(p-1) \quad (45)$$

$$\widetilde{a_q} = ((\Psi_d \oplus \widetilde{a_p}) \oplus d_q) + s(q-1) \quad (46)$$

Therefore, the fault occurring in $d_p$ is diffused to the first parameter $d'_p$ and the second parameter $d'_q$. According to this, the encrypted result S having the fault is random information that is independent of p and q.

As another example, if the attacker deforms the value $d_q$ in the process 3 of the algorithm shown in FIG. 10, $\widetilde{a_p}$ and $\widetilde{a_q}$ to which the fault is diffused may be calculated using equations 47 and 48.

$$\widetilde{a_p} = ((\Psi_d \oplus \widetilde{a_q}) \& d_p) + s(p-1) \quad (47)$$

$$\widetilde{a_q} = ((\Psi_d \oplus d_p) \oplus \widetilde{a_q}) + s(q-1) \quad (48)$$

Therefore, the fault occurring in $d_q$ is diffused to the first parameter $d'_p$ and the second parameter $d'_q$. According to this, the encrypted result S in which the fault has occurred is random information that is independent of p and q.

As another example, if the attacker deforms values $d'_p$ or $d'_q$ in the algorithm shown in FIG. 10, the fault is diffused to the intermediate values $L'_{d_p}$, $R'_{d_p}$, $CK_{R_p}$, and $S_{d_{pq}}$. Thus, the encrypted result S having the fault is random information that is independent of p and q.

As another example, if the attacker deforms p or q in the algorithm shown in FIG. 10, the fault is diffused to the intermediate values p' and q'. Thus, the encrypted result S having the fault is random information that is independent of p and q.

As another example, if the attacker deforms p' or q' in the algorithm shown in FIG. 10, the fault is diffused to the intermediate values $t_{d_p}$, $t_{d_q}$, $t_p$, and $t_q$. Thus, the encrypted result S having the fault is random information that is independent of p and q.

As another example, if the attacker deforms $\Psi_d$ or $\Psi_{pq}$ in the algorithm shown in FIG. 10, the fault is diffused to the intermediate values $d'_p$ and $d'_q$. Thus, the encrypted result S having the fault is random information that is independent of p and q.

Therefore, the secret values 'p' and/or 'q' will not be identified by fault attacks.

The CRT-RSA algorithm using the Feistel structure may operate safely against all the attacks that are currently known by only adding a small, additional computational load, approximately 0.002% to the original computational load for conventional CRT-RSA algorithms.

Figure 11:
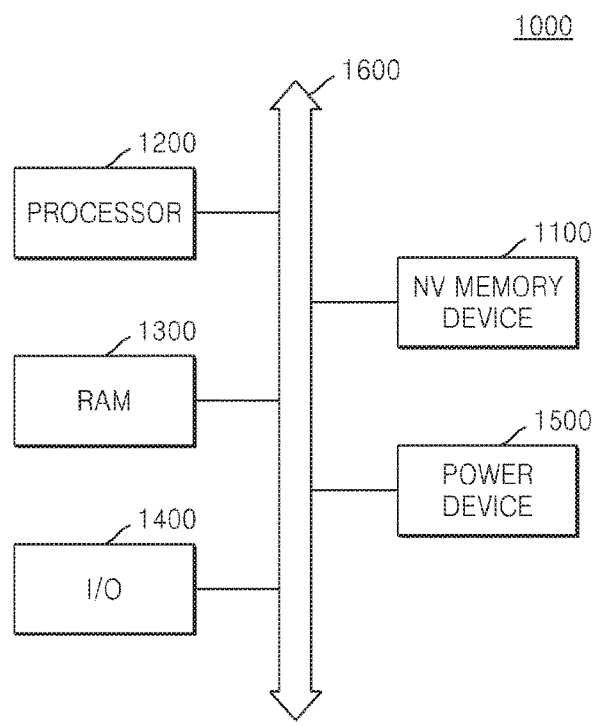
FIG. 11 is a block diagram illustrating a computer system that may operatively incorporate a CRT-RSA encryption method according to an embodiment of the inventive concept.

FIG. 11 is a block diagram illustrating a computer system 1000 that may be configured to use a CRT-RSA algorithm according to an embodiment of the inventive concept.

Referring to FIG. 11, the computer system 1000 generally comprises; a non-volatile (NV) memory device 1100, a processor 1200, a random access memory (RAM) 1300, an input/output (I/O) device 1400, a power device 1500, and a bus 1600. Although not shown in FIG. 11, the computer system 1000 may further include ports that may communicate with a video card, a sound card, a memory card, a USB device, or other electronic devices. The computer system 1000 may be realized as a PC, or a portable electronic appliance such as a mobile phone, a PDA, a camera, etc.

For example, the processor 1200 shown in FIG. 11 may include hardware or software for realizing the encryption processing unit 120 shown in FIG. 1 or FIG. 2.

For example, the NV memory 1100 shown in FIG. 11 may store program codes for executing the CRT-RSA encryption methods shown in FIGS. 3 through 7. Also, the NV memory 1100 may include program codes for executing the CRT-RSA algorithms shown in FIGS. 8 through 10.

The processor 1200 may perform certain calculations or tasks. For example, the processor 1200 may perform operations according to the CRT-RSA algorithm suggested by the present inventive concept. According to one or more embodiments of the present inventive concept, the processor 1200 may be a micro-processor or a central processing unit (CPU). The processor 1200 may communicate with the RAM 1300, the I/O device 1400, and the NV memory 1100 via the bus 1600 such as an address bus, a control bus, and a data bus. According to one or more embodiments, the processor 1200 may be connected to an expanded bus such as a peripheral component interconnect (PCI) bus.

The RAM 1300 may store data required to operate the computing system 1000. For example, the RAM 1300 may be a DRAM, a mobile DRAM, an SRAM, a PRAM, a ferroelectric RAM (FRAM), an RRAM, and/or an MRAM.

The I/O device 1400 may include an input unit, such as a keyboard, a keypad, or a mouse, and an output unit, such as a printer or a display. The power device 1500 may supply an operation voltage required to operate the computing system 1000.

Figure 12:
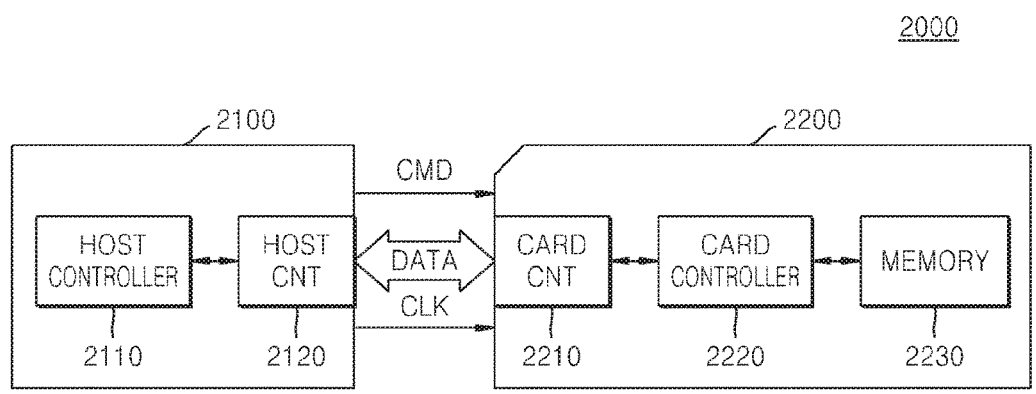
FIG. 12 is a block diagram of a memory card system that may operatively incorporate a CRT-RSA encryption method according to an embodiment of the inventive concept.

FIG. 12 is a block diagram illustrating a memory card system 2000 including a memory system that may be configured according to an embodiment of the inventive concept.

Referring to FIG. 12, the memory card system 2000 may include a host 2100 and a memory card 2200. The host 2100 may include a host controller 2110 and a host connector 2120. The memory card 2200 may include a card connection unit 2210, a card controller 2220, and a memory device 2230.

The memory device 2230 shown in FIG. 12 may store program codes for executing the CRT-RSA encryption methods shown in FIGS. 3 through 7. Also, the memory device 2230 may include program codes for executing the CRT-RSA algorithms shown in FIGS. 8 through 10.

The card controller 2220 may include hardware or software for realizing the encryption processing unit 120 shown in FIG. 1 or FIG. 2. Accordingly, the card controller 2220 may perform operations according to the CRT-RSA algorithm suggested by the embodiments of the present inventive concept.

The host 2100 may record data in the memory card 2200 or read the data stored in the memory card 2200. For example, the host 2100 may perform operations according to the CRT-RSA algorithm suggested by the embodiments of the present inventive concept.

The host controller 2110 may transmit a command CMD, a clock signal CLK generated by a clock generator (not shown) in the host 2100, and data (DATA) to the memory card 2200 via the host connector 2120.

For example, the host controller 2110 may include hardware or software realizing the encryption processing unit 120 shown in FIG. 1 or FIG. 2.

The memory card 2200 may be a compact flash card (CFC), a micro-drive, a smart media card (SMC), a multimedia card (MMC), a security digital card (SDC), a memory stick, or a USB flash memory driver.

Figure 13:
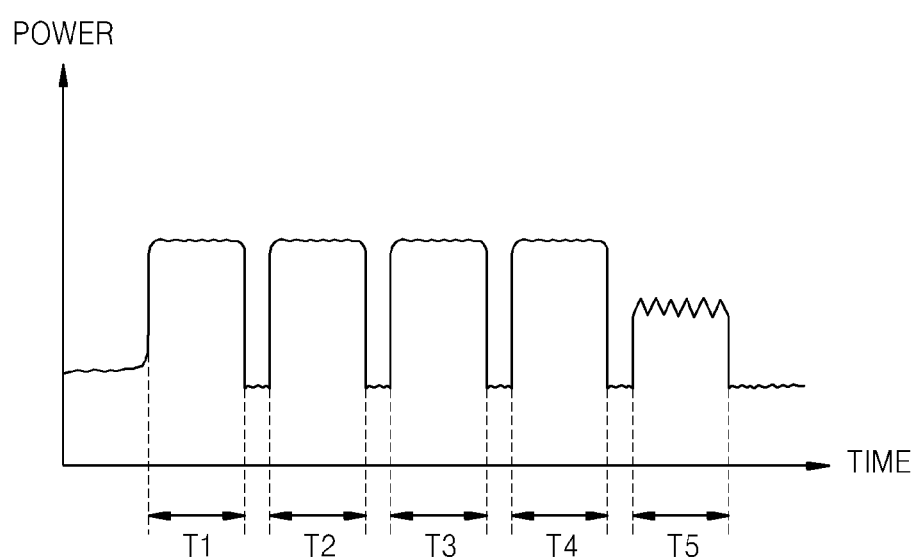
FIG. 13 is a power timing diagram illustrating exemplary power consumption distribution for an encryption process employing a CRT-RSA algorithm according to certain embodiments of the inventive concept.

FIG. 13 is a power timing waveform diagram illustrating exemplary power consumption distribution during an encryption process using an apparatus employing a CRT-RSA algorithm according to an embodiment of the inventive concept.

FIG. 13 shows power consumption distribution in a case where the encryption process is performed in an electronic appliance using the CRT-RSA algorithm shown in FIG. 8 or FIG. 10.

Referring to FIG. 13, periods T1, T2, T3, and T4 are time in which modular exponential calculations of a block unit are performed, and T5 is a period in which a CRT calculation is performed. In particular, a first modular exponential calculation with respect to 1A block information $L'_{d_p}$ divided from the first parameter information $d'_p$ in the section T1, a second modular exponential calculation with respect to 2A block information $L'_{d_q}$ divided from the second parameter information $d'_q$ in the section T2, a third modular exponential calculation with respect to 1B block information $R'_{d_p}$ divided from the first parameter information $d'_p$ in the section T3, and a fourth modular exponential calculation with respect to 2B block information $R'_{d_q}$ divided from the second parameter information $d'_q$ in the section T4.

The flash memory system described above may be mounted by using a package of any shape. For example, a memory system of the inventive concept may be mounted by using a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated chip (SOIC), a shrink small outline package (SSOP), a thin small outline package (TSOP), a thin quad flat pack (TQFP), a system in package (SIP), a multi chip package (MCP), a wafer-level fabricated package (WFP), or a wafer-level processed stack package (WSP).

Different embodiments of the inventive concept may be variously implemented in a method, an apparatus, or a system. When the inventive concept is implemented, wholly or in part, in software, its component elements are code segments required to execute the necessary functionality. Programs or code segments may be stored in processor readable media and may be communicated via a computer data signal in a transmission medium or in a communication network. The processor readable medium can be any medium capable of storing and/or communicating data. Examples of the processor readable medium include electronic circuits, semiconductor memory devices, ROMs, flash memories, erasable ROMs (EROMs), floppy disks, optical disks, hard disks, optical fibers, radio frequency (RF) networks, etc.

While the inventive concept has been particularly shown and described with reference to exemplary embodiments thereof, it will be understood that various changes in form and details may be made therein without departing from the scope of the following claims.

What is claimed is:

1. A Chinese Remainder Theorem (CRT)-Rivest Shamir Adleman (RSA) (CRT-RSA) encryption method, comprising:
    calculating, using an intermediate value calculator, a first parameter information and a second parameter information based on a secret key, respectively;
    performing a modular exponential calculation process with respect to a next block based on calculation information of a previous block according to a block unit divided respectively from the first parameter information and second parameter information; and
    calculating, using a CRT calculator, an encryption process result based on a CRT calculation using results of the modular exponential calculation,
    wherein the modular exponential calculation process includes:

extracting N (N≥2, where N is an integer) block information from the first parameter information and the second parameter information, respectively; and performing a plurality of modular exponential calculations based on the N block information.

2. The CRT-RSA encryption method of claim 1, wherein the calculating of the first parameter information and the second parameter information comprises:

determining intermediate calculation information $d_p$ and $d_q$ respectively generated by equations: $d_p = d \mod(p-1)$ and $d_q = d \mod(q-1)$ as the first parameter information and the second parameter information, wherein d denotes the secret key, p and q denote prime numbers, and a public key N satisfies the condition (N=p times q).

3. The CRT-RSA encryption method of claim 1, wherein the calculating of the first parameter information and the second parameter information comprises:

calculating intermediate calculation information $d_p$ and $d_q$ based on equations $d_p = d \mod(p-1)$ and $d_q = d \mod(q-1)$; and calculating the first parameter information $d'_p$ and the second parameter information $d'_q$ by respectively deriving $d'_p$ and $d'_q$ from the intermediate calculation information $d_p$ and $d_q$ using both the intermediate calculation information $d_p$ and $d_q$, wherein d denotes the secret key, p and q denote prime numbers, and a public key N satisfies the condition (N=p times q).

4. The CRT-RSA encryption method of claim 1, wherein the performing of the modular exponential calculation process comprises:

dividing the first parameter information and the second parameter information respectively into N blocks.

5. The CRT-RSA encryption method of claim 4, wherein the first parameter information and the second parameter information are respectively divided into the N blocks of equal size.

6. The CRT-RSA encryption method of claim 1, wherein the extracting of the N block information from the first parameter information and the second parameter information, respectively, comprises:

performing a first modular exponential calculation based on a first (1A) block information;

performing a second modular exponential calculation based on a second (2A) block information;

performing a third modular exponential calculation based on a third (1B) block information using a result of the modular exponential calculation of the first (1A) block information; and performing a fourth modular exponential calculation based on a fourth (2B) block information using a result of the modular exponential calculation of the second (2A) block information.

7. The CRT-RSA encryption method of claim 6, wherein the extracting of the first (1A) block information comprises:

calculating the first (1A) block information $L'_{d_p}$ based on an equation $$L'_{d_p} = LeftB(d'_p) = \sum_{i=\frac{n}{2}}^{n-1} d'_{p_i} 2^{i-\frac{n}{2}} = \left(d'_{p_{n-1}}, d'_{p_{n-2}}, \ldots, d'_{p_{\frac{n}{2}}}\right)_2$$

from the first parameter information $d'_p$ having an n-bit length.

8. The CRT-RSA encryption method of claim 6, wherein the extracting of the second (2A) block information comprises:

calculating the second (2A) block information $L'_{d_q}$ based on an $$L'_{d_q} = LeftB(d'_q) = \sum_{i=\frac{n}{2}}^{n-1} d'_{q_i} 2^{i-\frac{n}{2}} = \left(d'_{q_{n-1}}, d'_{q_{n-2}}, \ldots, d'_{q_{\frac{n}{2}}}\right)_2$$

equation from the second parameter information $d'_q$ having an n-bit length.

9. The CRT-RSA encryption method of claim 6, wherein the performing of the first modular exponential calculation comprises:

calculating a first calculation value $L_{S_p}$ and a second calculation value $L'_{S_p}$ that are modular exponential calculation results with respect to the first (1A) block information $L'_{d_p}$ divided from the first parameter information $d'_p$ based on equations $L_{S_p} = m^{LeftB(d'_p)+1} \mod sp$ and $L'_{S_p} = m^{Left(d'_p)} \mod sp$, wherein m denotes a message to be encrypted, and s denotes a random number.

10. The CRT-RSA encryption method of claim 9, wherein the performing of the first modular exponential calculation comprises:

calculating a third calculation value $CK_{L_p}$ based on an equation $CK_{L_p} = LeftB(d'_p) \oplus p'$, where $p'$ denotes intermediate calculation information derived from a prime number p.

11. The CRT-RSA encryption method of claim 6, wherein the performing of the second modular exponential calculation comprises:

calculating a calculation value $L_{S_q}$ and a calculation value $L'_{S_q}$ that are modular exponential calculation results with respect to the second (2A) block information $L'_{d_q}$ divided from the second parameter information $d'_q$ based on equations: $L_{S_q} = m^{LeftB(d'_q)+1} \mod sq$ and $L'_{S_q} = m^{LeftB(d'_q)} \mod sq$ wherein m is a message to be encrypted, and 's' denotes a random number.

12. The CRT-RSA encryption method of claim 11, wherein the performing of the second modular exponential calculation further comprises:

calculating a calculation value $CK_{L_q}$ based on an equation $CK_{L_q} = LeftB(d'_q) \oplus q'$, wherein $q'$ denotes intermediate calculation information derived from a prime number q.

13. The CRT-RSA encryption method of claim 6, wherein the extracting of the third (1B) block information comprises:

calculating the third (1B) block information $R'_{d_p}$ from the first parameter information $d'_p$ having an n-bit length based on an equation $$R'_{d_p} = (\Psi_d \oplus d'_q) - t'_{d_p} \cdot 2^{\frac{n}{2}},$$

wherein $\Psi_d$ is determined based on $d_p$ and $d_q$, $d_p$ and $d_q$ are determined respectively based on equations $d_p = d \mod(p-1)$ and $d_q = d \mod(q-1)$, $t'_{d_p}$ is determined based on the first (1A) block information and the intermediate calculation information, wherein $d'_q$ denotes the second parameter information.

14. The CRT-RSA encryption method of claim 6, wherein the extracting of the fourth (2B) block information comprises:

calculating the fourth (2B) block information $R'_{d_q}$ from the second parameter information $d'_q$ of an n-bit length based on an equation $$R'_{d_q} = (\Psi_d \oplus d'_p) - t'_{d_q} \cdot 2^{\frac{n}{2}},$$

wherein $\Psi_d$ is determined based on $d_p$ and $d_q$, $d_p$ and $d_q$ are determined respectively based on equations $d_p=d \mod(p-1)$ and $d_q=d \mod(q-1)$, $t'_{d_q}$ is determined based on the first (1A) block information and the intermediate calculation information, wherein $d'_p$ denotes the first parameter information.

15. The CRT-RSA encryption method of claim 6, wherein the performing of the third modular exponential calculation comprises:
calculating a calculation value $R_{S_p}$ and a calculation value $R'_{S_p}$ using equations $R_{S_p}=m^{d'_p} \mod sp$ and $R'_{S_p}=m^{d'_p-1} \mod sp$ by performing a modular exponential calculation with respect to the third (1B) block information $R'_{d_p}$ using the modular exponential calculation result with respect to the first (1A) block information $L'_{d_p}$, wherein $d'_p$ denotes the first parameter information, m denotes a message to be encrypted, and s denotes a random number.

16. The CRT-RSA encryption method of claim 15, wherein the performing of the third modular exponential calculation further comprises:
calculating a ninth calculation value $CK_{R_p}$ using the equation $$CK_{R_p} = \left(\sum_{i=0}^{\frac{n}{2}-1} d'_{p_i} \cdot 2^i\right) \oplus p',$$

wherein p' denotes intermediate calculation information derived from a prime number p.

17. The CRT-RSA encryption method of claim 6, wherein the performing of the fourth modular exponential calculation comprises:
calculating a calculation value $R_{S_q}$ and a calculation value $R'_{S_q}$ using the equations $R_{S_q}=m^{d'_q} \mod sq$ and $R'_{S_q}=m^{d'_q-1} \mod sq$ by performing a modular exponential calculation with respect to the fourth (2B) block information $R'_{d_q}$ using the modular exponential calculation information with respect to the second (2A) block information $L'_{d_q}$, wherein $d'_q$ denotes the second parameter information, m denotes a message to be encrypted, and s denotes a random number.

18. The CRT-RSA encryption method of claim 17, wherein the performing of the fourth modular exponential calculation further comprises:
calculating a calculation value $CK_{R_q}$ based on an equation $$CK_{R_q} = \left(\sum_{i=0}^{\frac{n}{2}-1} d'_{q_i} \cdot 2^i\right) \oplus q',$$

wherein q' denotes intermediate calculation information derived from a prime number q.

19. The CRT-RSA encryption method of claim 1, wherein the calculating of the encryption process result comprises:
calculating a calculation value S and a calculation value S' using the equations $S=CRT_{FA}(R_{S_p},R_{S_q})=m^d-(d'_p \oplus d_q) \mod N$ and $S'=CRT_{FA}(R'_{S_p},R'_{S_q})=m^{d-1}-(d'_p \oplus d'_q) \mod N$ by using the modular exponential calculation results; and
outputting an encrypted result based on a comparison result of the calculation value S and the calculation value S',
wherein $R_{S_p}$ and $R'_{S_p}$ are values calculated during the modular exponential calculations based on the first parameter $d'_p$, $R_{S_q}$ and $R'_{S_q}$ are values calculated during the modular exponential calculations based on the second parameter $d'_q$, and m is a message.

20. A Chinese Remainder Theorem (CRT)-Rivest Shamir Adleman (RSA) (CT_RSA) encryption apparatus, comprising:
a register block that stores input information necessary for encryption processes and intermediate calculation information generated during encryption calculation processes;
an intermediate value calculator that calculates intermediate calculation information including first parameter information and second parameter information for determining an exponentiation operation value about a message in a modular exponential calculation process by applying input information read from the register block;
an information partition processing unit that divides the first parameter information and the second parameter information respectively into a plurality of blocks;
a modular multiplier that performs modular exponentiation calculation processes by applying the intermediate calculation information to each of the blocks divided from the first parameter information and the second parameter information through a plurality of calculating iterations;
a CRT calculator that performs a CRT calculation using results of the modular exponential calculation; and
an encryption result calculator that calculates an encryption processing result based on a result of the CRT calculation,
wherein the modular exponential calculation processes include:
extracting a first (1A) block information from the first parameter information;
extracting a second (2A) block information from the second parameter information;
extracting a third (1B) block information remaining, except for the first (1A) block information, from the first parameter information;
extracting a fourth (2B) block information remaining, except for the second (2A) block information, from the second parameter information; and
performing a plurality of modular exponential calculations based on the first (1A) through fourth (2B) block information.

* * * * *